(12) United States Patent
Noda et al.

(10) Patent No.: US 11,715,328 B2
(45) Date of Patent: Aug. 1, 2023

(54) IMAGE PROCESSING APPARATUS FOR SELECTING IMAGES BASED ON A STANDARD

(71) Applicant: FUJIFILM Corporation, Tokyo (JP)

(72) Inventors: Shimpei Noda, Tokyo (JP); Tetsuya Matsumoto, Tokyo (JP); Masaya Usuki, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 16/543,209

(22) Filed: Aug. 16, 2019

(65) Prior Publication Data
US 2020/0089936 A1    Mar. 19, 2020

(30) Foreign Application Priority Data
Sep. 19, 2018   (JP) .................................. 2018-174487

(51) Int. Cl.
G06V 40/16    (2022.01)
G06T 7/187    (2017.01)
G06T 7/70    (2017.01)

(52) U.S. Cl.
CPC ............ *G06V 40/167* (2022.01); *G06T 7/187* (2017.01); *G06T 7/70* (2017.01); *G06V 40/168* (2022.01);
(Continued)

(58) Field of Classification Search
CPC . G06T 2207/10016; G06T 2207/30196; G06F 16/783; G06F 16/50;
(Continued)

(56) References Cited

U.S. PATENT DOCUMENTS

| 9,390,107 B2 * | 7/2016 | Cohen ................... G06F 16/447 |
| 2006/0139461 A1 * | 6/2006 | Matsui ................... G11B 27/28 |
| | | 348/231.2 |

(Continued)

FOREIGN PATENT DOCUMENTS

| CN | 102855906 A | 1/2013 |
| CN | 105512255 A | 4/2016 |

(Continued)

OTHER PUBLICATIONS

D photo print service function; NTT Docomo, Inc; online, URL: https://photo-collection.nttdocomo.co.jp/dphoto/service/.
(Continued)

*Primary Examiner* — Guillermo M Rivera-Martinez
(74) *Attorney, Agent, or Firm* — Studebaker & Brackett PC

(57) ABSTRACT

An image processing apparatus, an image processing method, and an image processing program capable of selecting an image having common characteristics with a previously selected image, and a recording medium storing the program are provided. In a case where an image of a child and a father captured together is included in common in a first image selected from a first image group and a second image selected from a second image group, a speech balloon 200 for notifying a user to select such an image IR1 from a target image group is displayed on a display panel 21 of a smartphone. In a case where the user selects the image IR1 of the child and the father captured together, common characteristics with a previously selected image are maintained.

22 Claims, 27 Drawing Sheets

(52) U.S. Cl.
CPC .............. *G06T 2207/20104* (2013.01); *G06T 2207/30196* (2013.01)

(58) Field of Classification Search
CPC . G06F 16/4393; G06F 3/147; G06K 9/00677; G06K 9/6218; G06V 30/10; G06V 20/53; G06V 30/413; G06V 40/16
See application file for complete search history.

(56) References Cited

U.S. PATENT DOCUMENTS

| | | | | |
|---|---|---|---|---|
| 2009/0116752 | A1* | 5/2009 | Isomura | G06F 16/58 382/224 |
| 2009/0161962 | A1* | 6/2009 | Gallagher | G06F 16/58 382/203 |
| 2011/0110592 | A1* | 5/2011 | Wada | G06V 20/10 382/182 |
| 2012/0148165 | A1* | 6/2012 | Yabu | G06F 16/583 382/224 |
| 2012/0170075 | A1* | 7/2012 | Minamino | H04N 1/00435 358/1.15 |
| 2013/0004073 | A1* | 1/2013 | Yamaji | H04N 1/00196 382/173 |
| 2014/0078177 | A1* | 3/2014 | Yamaji | G09G 5/14 345/634 |
| 2015/0077376 | A1* | 3/2015 | Masuda | G06F 3/04845 345/173 |
| 2015/0085317 | A1* | 3/2015 | Kim | G06F 3/1253 358/1.15 |
| 2015/0379748 | A1* | 12/2015 | Kumazaki | G06T 11/60 382/284 |
| 2016/0004695 | A1* | 1/2016 | Yang | G06F 3/0485 707/738 |
| 2016/0350598 | A1* | 12/2016 | Yamaji | G06V 40/16 |
| 2016/0371536 | A1* | 12/2016 | Yamaji | G06F 16/583 |
| 2017/0185843 | A1* | 6/2017 | Goto | G06T 7/74 |
| 2018/0068019 | A1* | 3/2018 | Novikoff | G06F 16/58 |
| 2018/0173083 | A1* | 6/2018 | Okumura | G03B 21/00 |
| 2021/0011940 | A1* | 1/2021 | Tang | G06F 16/587 |

FOREIGN PATENT DOCUMENTS

| | | |
|---|---|---|
| JP | 2003-288350 A | 10/2003 |
| JP | 2005-065728 A | 3/2005 |
| JP | 2006-229682 A | 8/2006 |
| JP | 2006-252196 A | 9/2006 |
| JP | 2007-060562 A | 3/2007 |
| JP | 2009-017070 A | 1/2009 |
| JP | 2013-196417 A | 9/2013 |
| JP | 2017-010251 A | 1/2017 |
| JP | 2017-068331 A | 4/2017 |

OTHER PUBLICATIONS

An Office Action mailed by China National Intellectual Property Administration dated Sep. 4, 2020, which corresponds to Chinese Patent Application No. 201910787471.4 and is related to U.S. Appl. No. 16/543,209 with English language translation.

An Office Action mailed by China National Intellectual Property Administration dated Feb. 20, 2021, which corresponds to Chinese Patent Application No. 201910787471.4 and is related to U.S. Appl. No. 16/543,209 with English language translation.

An Office Action; "Notice of Reasons for Refusal", mailed by the Japanese Patent Office dated Aug. 17, 2021, which corresponds to Japanese Patent Application No. 2018-174487 and is related to U.S. Appl. No. 16/543,209; with English language translation.

* cited by examiner

IMAGE PROCESSING APPARATUS FOR SELECTING IMAGES BASED ON A STANDARD

CROSS-REFERENCE TO RELATED APPLICATIONS

The present application claims priority under 35 U.S.C. § 119 to Japanese Patent Application No. 2018-174487, filed Sep. 19, 2018. Each of the above application(s) is hereby expressly incorporated by reference, in its entirety, into the present application.

BACKGROUND OF THE INVENTION

1. Field of the Invention

The invention relates to an image processing apparatus, an image processing method, and an image processing program.

2. Description of the Related Art

The number of captured images is significantly increased along with wide use of digital cameras and smartphones. In a case where image data representing the captured image is stored in the main body of a memory card or a smartphone, the captured image is buried. In order to find the image, for example, it is considered that data search for creating a reprint is performed (JP2003-288350A), a similar image is searched (JP2005-065728A), an image having a high importance to a user is extracted (JP2017-010251A), or an image matching the sensitivity of a person can be recommended (JP2013-196417A). In addition, a service providing photo prints or a photo book configured by combining the photos in a case where a specification of a certain number of photo data is received from a user based on a reservation of monthly payment of a certain amount of fee is provided (d photo print service function.

SUMMARY OF THE INVENTION

In a case where it is considered that a certain number of images are selected from captured images and are periodically printed by subscribing a service like d photo print service function, a technology that is reviewed as considering which image is to be preferably selected from multiple images for a user is not present. In JP2003-288350A, since the reprint is performed, a consideration as to which image is to be selected from non-printed images is not made. In JP2005-065728A, an image similar to a diagnosis target is searched, and a consideration as to which image is to be periodically found is not made. In JP2017-010251A, an image having a high importance is extracted, and a consideration as to which image is to be periodically selected is not made. In JP2013-196417A, an image matching the sensitivity of a person making a selection is recommended, and a consideration as to which image is to be periodically selected is not made.

An object of the invention is to enable selection of an image preferable for a user from multiple images in periodic selection of images.

The present inventors perceive the present invention by founding that it is not preferable for a user in a case where an image group selected in each period has common characteristics in the case of periodically selecting an image from multiple images. An image processing apparatus according to the invention comprises an image group input device (image group input means) for inputting a target image group for selecting one or a plurality of images, and a first notification control device (first notification control means) for causing a first notification device (first notification means) to perform notification of first information related to an image recommended as the image to be selected from the target image group input from the image group input device based on a standard for selecting the image and created by a selection standard creation device (selection standard creation means) from one or a plurality of first images selected from a first image group and one or a plurality of second images selected from a second image group. The selection standard creation device may be comprised in the image processing apparatus or may be comprised in an apparatus different from the image processing apparatus. For example, in the case of performing a process while communicating between a smartphone (client computer) and an image server, the smartphone (client computer) may comprise the selection standard creation device, or the image server may comprise the selection standard creation device.

The invention also provides an image processing method suitable for the image processing apparatus. That is, the method comprises inputting a target image group for selecting one or a plurality of images by an image group input device (image group input means), and causing a first notification device (first notification means) to perform notification of first information related to an image recommended as an image to be selected from the target image group input from the image group input device by a first notification control device (first notification control means) based on a standard for selecting the image and created by a selection standard creation device (selection standard creation means) from one or a plurality of first images selected from a first image group and one or a plurality of second images selected from a second image group.

The invention also provides a non-transitory recording medium storing a program readable by a computer of the image processing apparatus. The invention further provides an image processing apparatus comprising: an image group input device for inputting a target image group for selecting one or a plurality of images; and a processor; wherein the processor causes a first notification device to perform notification of first information related to an image recommended as the image to be selected from the target image group input from the image group input device based on a standard for selecting the image and created by a selection standard creation device from one or a plurality of first images selected from a first image group and one or a plurality of second images selected from a second image group.

In addition, the image processing apparatus may comprise a processor, and the processor may input a target image group for selecting one or a plurality of images, and cause a first notification device (first notification means) to perform notification of first information related to an image recommended as an image to be selected from the input target image group based on a standard for selecting the image and created by a selection standard creation device (selection standard creation means) from one or a plurality of first images selected from a first image group and one or a plurality of second images selected from a second image group.

For example, the selection standard creation device may create the standard such that an image having a theme obtained in common from the first image and the second image is selected.

For example, the selection standard creation device may create the standard such that an image having a theme that is obtained in common from one image of the plurality of first images and one image of the plurality of second images and is a theme other than a theme obtained in common from another image of the plurality of first image and another image of the plurality of second images is selected.

For example, the selection standard creation device may create the standard such that an image having a theme obtained in common from themes of all of the plurality of first images and themes of all of the plurality of second images is selected.

For example, the selection standard creation device may create the standard such that an image of which a first similarity with both of the first image and the second image is higher than or equal to a first threshold is selected from the target image group.

For example, the selection standard creation device may create the standard such that an image showing a change in common subject between a subject included in the first image and a subject included in the second image is selected.

The image processing apparatus may further comprise the selection standard creation device.

The image processing apparatus may further a comprise reception device (comprise reception means) for receiving data representing the standard created by the selection standard creation device. In this case, for example, the first notification control device may cause the first notification device to perform the notification of the first information based on the standard represented by the data received by the reception device.

For example, the notification of the first information in the first notification control device is a display for distinguishing the image recommended as the image to be selected from the target image group from an image other than the recommended image in the target image group.

For example, the notification of the first information in the first notification control device is a display of the image recommended as the image to be selected from the target image group by attaching a mark to the recommended image.

For example, the notification of the first information in the first notification control device is a display of a state of a subject in the image recommended as the image to be selected from the target image group using a text string or a sample image.

For example, the notification of the first information in the first notification control device is a display of an image of the first image or the second image of which a second similarity with the image to be selected from the target image group is higher than or equal to a second threshold.

The image processing apparatus may further comprise a second notification control device (second notification control means) for performing notification of second information related to a theme such that an image having the theme obtained from the first image and the second image is captured.

For example, the notification of the second information in the second notification control device is a display of the theme.

For example, the notification of the second information in the second notification control device is a display of a sample image corresponding to the theme.

For example, the notification of the second information in the second notification control device is a display of an image of the first image or the second image having a common theme.

The image processing apparatus may further comprise a display control device (display control means) for controlling a display device such that an image having a common theme among the plurality of first images and the plurality of second images is displayed for a certain amount of time in alternate order of the plurality of first images and the plurality of second images.

An imaging time period of the first image group, an imaging time period of the second image group, and an imaging time period of the target image group may be different.

According to the invention, the notification of the first information related to the image recommended as the image to be selected from the target image group is performed based on the standard created from the selected first image and second image. Accordingly, based on the first information, an image having common characteristics with the selected first image and second image can be selected from the target image group. Consequently, in the case of periodically selecting an image from multiple images, an image preferable for a user can be selected.

DESCRIPTION OF THE PREFERRED EMBODIMENTS

Main Example

Figure 1:
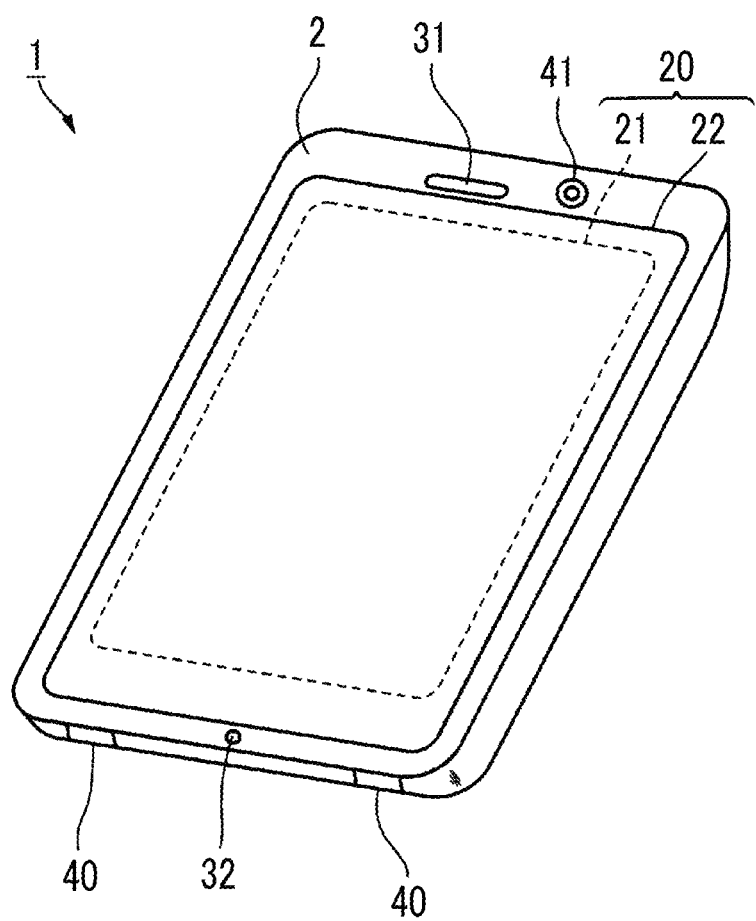
FIG. 1 illustrates the exterior of a smartphone.

FIG. 1 illustrates the exterior of a smartphone 1 as one embodiment of an image processing apparatus according to the present invention. The smartphone 1 illustrated in FIG. 1 includes a casing 2 having a flat plate shape and comprises a display and input unit 20 in which a display panel 21 as a display unit and an operation panel 22 as an input unit are formed as a single unit on one surface of the casing 2. In addition, the casing 2 comprises a microphone 32, a speaker 31, an operation unit 40, and a camera unit 41. The configuration of the casing 2 is not for limitation purposes. For example, a configuration in which the display unit and the input unit are independent of each other can be employed, or a configuration having a folded structure or a sliding mechanism can be employed.

Figure 2:
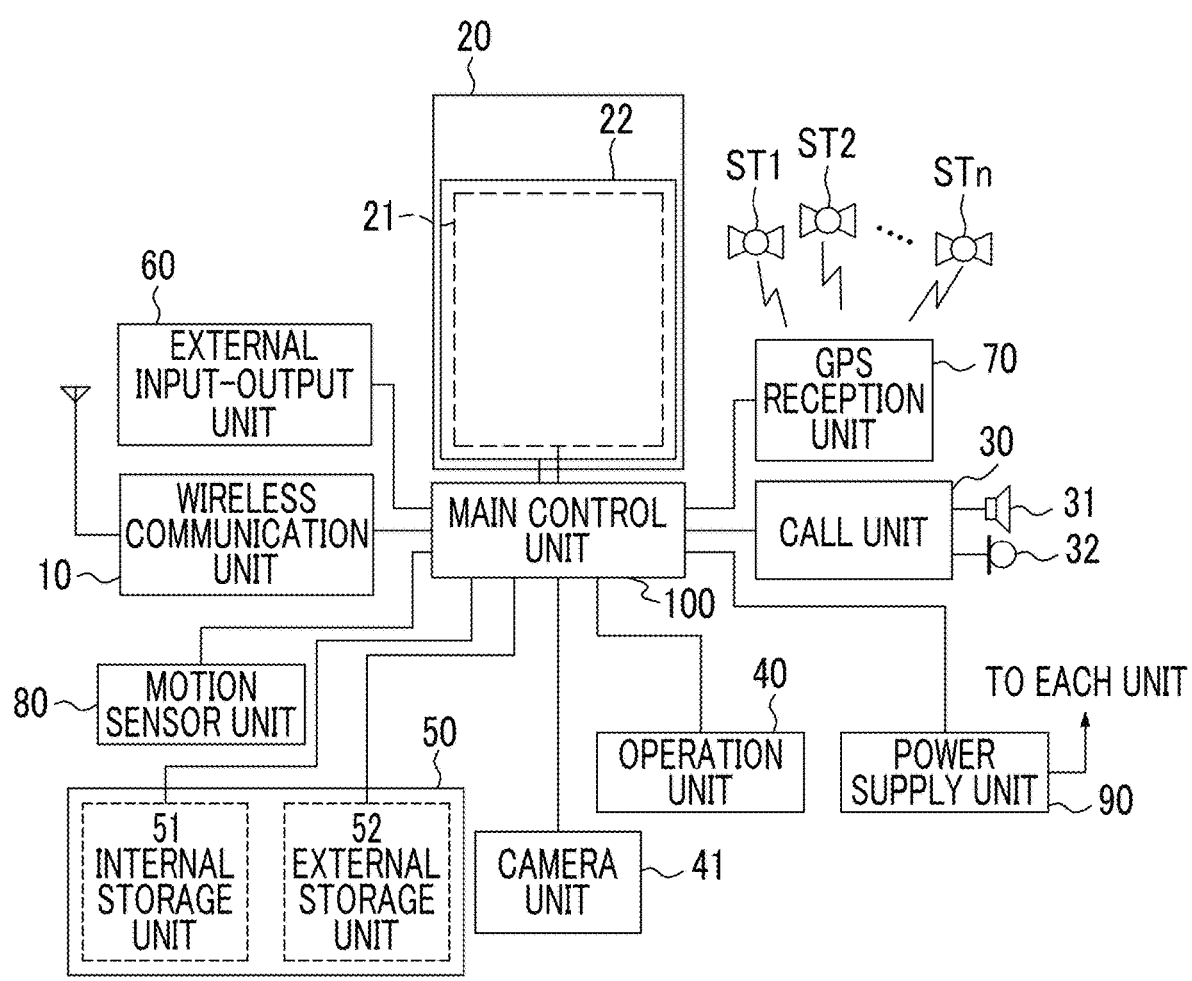
FIG. 2 is a block diagram illustrating an electric configuration of the smartphone.

FIG. 2 is a block diagram illustrating a configuration of the smartphone 1 illustrated in FIG. 1. As illustrated in FIG. 2, main constituents of the smartphone comprise a wireless communication unit 10, the display and input unit 20, a call unit 30, the operation unit 40, the camera unit 41, a storage unit 50, an external input-output unit 60, a global positioning system (GPS) reception unit 70, a motion sensor unit 80, a power supply unit 90, and a main control unit 100. In addition, main functions of the smartphone 1 comprise a wireless communication function of performing mobile wireless communication with a base station apparatus BS through a mobile communication network NW.

The wireless communication unit 10 performs wireless communication with the base station apparatus BS accommodated in the mobile communication network NW in accordance with an instruction from the main control unit 100. By using the wireless communication, transmission and reception of various file data such as voice data and image data, electronic mail data, and the like and reception of web data, streaming data, and the like are performed.

The display and input unit 20 is a so-called touch panel that visually delivers information to a user by displaying images (still images and motion images), text information, and the like and detects a user operation performed on the displayed information under control of the main control unit 100. The display and input unit 20 comprises the display panel 21 and the operation panel 22.

The display panel 21 uses a liquid crystal display (LCD), an organic electro-luminescence display (OELD), or the like as a display device. The operation panel 22 is a device that is mounted in a manner enabling visual recognition of an image displayed on a display surface of the display panel 21 and detects one or a plurality of coordinates operated by a finger of the user or a stylus. In a case where the device is operated by the finger of the user or the stylus, a detection signal generated by the operation is output to the main control unit 100. Next, the main control unit 100 detects the operation position (coordinates) on the display panel 21 based on the received detection signal.

As illustrated in FIG. 1, the display panel 21 and the operation panel 22 of the smartphone 1 illustrated as one embodiment of the image processing apparatus according to the present invention constitute the display and input unit 20 as a single unit. The operation panel 22 is arranged to completely cover the display panel 21. In the case of employing such an arrangement, the operation panel 22 may comprise a function of detecting the user operation even in a region outside the display panel 21. In other words, the operation panel 22 may comprise a detection region (hereinafter, referred to as the display region) for an overlapping part in overlap with the display panel 21 and a detection region (hereinafter, referred to as the non-display region) for the other peripheral part not in overlap with the display panel 21.

The size of the display region may completely match the size of the display panel 21, but both sizes do not necessarily match. In addition, the operation panel 22 may comprise two sensitive regions including the peripheral part and the other inner part. Furthermore, the width of the peripheral part is appropriately designed depending on the size and the like of the casing 2. Furthermore, a position detection method employed in the operation panel 22 is exemplified by a matrix switch method, a resistive film method, a surface acoustic wave method, an infrared method, an electromagnetic induction method, an electrostatic capacitive method, and the like. Any method can be employed.

The call unit 30 comprises the speaker 31 and the microphone 32. The call unit 30 converts the voice of the user input through the microphone 32 into voice data processable in the main control unit 100 and outputs the voice data to the main control unit 100, or decodes the voice data received by the wireless communication unit 10 or the external input-output unit 60 and outputs the decoded voice data from the speaker 31. In addition, as illustrated in FIG. 1, for example, the speaker 31 can be mounted on the same surface as the surface on which the display and input unit 20 is disposed, and the microphone 32 can be mounted on a side surface of the casing 2.

The operation unit 40 is a hardware key using a key switch or the like and receives an instruction from the user. For example, as illustrated in FIG. 1, the operation unit 40 is a push-button type switch that is mounted on a side surface of the casing 2 of the smartphone 1. In a case where the operation unit 40 is pressed by the finger or the like, the operation unit 40 enters an ON state. In a case where the finger is released, the operation unit 40 enters an OFF state by a restoring force of a spring or the like.

The storage unit 50 stores a control program and control data of the main control unit 100, application software, address data in which a name, a telephone number, and the like of a communication counterpart are associated, data of transmitted and received electronic mails, web data downloaded by web browsing, and downloaded contents data and also temporarily stores streaming data and the like. In addition, the storage unit 50 is configured with an internal storage unit 51 incorporated in the smartphone and an external storage unit 52 including a slot for an attachable and detachable external memory. Each of the internal storage unit 51 and the external storage unit 52 constituting the storage unit 50 is implemented using a storage medium such as a memory of a flash memory type, a hard disk type, a multimedia card micro type, or a card type (for example, a MicroSD (registered trademark) memory), a random access memory (RAM), or a read only memory (ROM).

The external input-output unit 60 acts as an interface for all external apparatuses connected to the smartphone 1 and is directly or indirectly connected to other external apparatuses by communication and the like (for example, Universal Serial Bus (USB) and IEEE 1394) or networks (for example, the Internet, a wireless LAN, Bluetooth (registered trademark), radio frequency identification (RFID), Infrared Data Association (IrDA) (registered trademark), Ultra Wideband (UWB) (registered trademark), and ZigBee (registered trademark)).

For example, the external apparatuses connected to the smartphone 1 include a wired/wireless headset, a wired/wireless external charger, a wired/wireless data port, a memory card or a subscriber identity module (SIM) card/user identity module (UIM) card connected through a card socket, an external audio and video apparatus connected through an audio and video input/output (I/O) terminal, a wirelessly connected external audio and video apparatus, a smartphone connected in a wired/wireless manner, a personal computer connected in a wired/wireless manner, a PDA connected in a wired/wireless manner, and an earphone connected in a wired/wireless manner. The external input-output unit can deliver data transferred from the external apparatuses to each constituent inside the smartphone 1 or transfer data inside the smartphone 1 to the external apparatuses.

The GPS reception unit 70 receives GPS signals transmitted from GPS satellites ST1 to STn, executes a position measurement calculation process based on the plurality of received GPS signals, and obtains a position including the latitude, the longitude, and the altitude of the smartphone 1 in accordance with an instruction from the main control unit 100. When positional information can be obtained from the wireless communication unit 10 or the external input-output unit 60 (for example, a wireless LAN), the GPS reception unit 70 can detect the position using the positional information.

The motion sensor unit 80 comprises, for example, a 3-axis acceleration sensor and detects a physical motion of the smartphone 1 in accordance with an instruction from the main control unit 100. By detecting the physical motion of the smartphone 1, the movement direction and the acceleration of the smartphone 1 are detected. The detection result is output to the main control unit 100.

The power supply unit 90 supplies power stored in a battery (not illustrated) to each unit of the smartphone 1 in accordance with an instruction from the main control unit 100.

The main control unit 100 comprises a microprocessor, operates in accordance with the control program and the control data stored in the storage unit 50, and manages and controls each unit of the smartphone 1. In addition, the main control unit 100 comprises a mobile communication control function of controlling each unit of a communication system and an application processing function in order to perform voice communication and data communication through the wireless communication unit 10.

The application processing function is implemented by operating the main control unit 100 in accordance with the application software stored in the storage unit 50. For example, the application processing function includes an infrared communication function of performing data communication with an opposing device by controlling the external input-output unit 60, an electronic mail function of transmitting and receiving electronic mails, and a web browsing function of browsing a web page.

In addition, the main control unit 100 comprises an image processing function such as displaying a video on the display and input unit 20 based on image data (data of a still image or a motion image) such as reception data and downloaded streaming data. The image processing function is a function of causing the main control unit 100 to decode the image data, perform image processing on the decoding result, and display the image on the display and input unit 20.

Furthermore, the main control unit 100 executes display control of the display panel 21 and operation detection control for detecting the user operation performed through the operation unit 40 or the operation panel 22. By executing the display control, the main control unit 100 displays an icon for starting the application software or a software key such as a scroll bar, or displays a window for composing an electronic mail. The scroll bar refers to a software key for receiving an instruction to move a display part of an image for a large image or the like not accommodated in the display region of the display panel 21.

In addition, by executing the operation detection control, the main control unit 100 detects the user operation performed through the operation unit 40, receives an operation performed on the icon through the operation panel 22 or an input of a text string in an input field of the window, or receives a request for scrolling the display image through the scroll bar.

Furthermore, by executing the operation detection control, the main control unit 100 comprises a touch panel control function of determining whether the operation position on the operation panel 22 is in the overlapping part (display region) in overlap with the display panel 21 or the other peripheral part (non-display region) not in overlap with the display panel 21 and controlling the sensitive region of the operation panel 22 and the display position of the software key.

In addition, the main control unit 100 can detect a gesture operation performed on the operation panel 22 and execute a present function depending on the detected gesture operation. The gesture operation is not a simple touch operation in the related art and means an operation of drawing a trajectory by the finger or the like or specifying a plurality of positions at the same time, or an operation of a combination thereof by drawing a trajectory from at least one of the plurality of positions.

The camera unit 41 is a digital camera performing electronic imaging using an imaging element such as a complementary metal oxide semiconductor (CMOS) or a charge-coupled device (CCD). In addition, the camera unit 41 converts the image data obtained by imaging into compressed image data in, for example, Joint Photographic Experts Group (JPEG) and records the image data in the storage unit 50 or outputs the image data through the external input-output unit 60 or the wireless communication unit 10 under control of the main control unit 100. As illustrated in FIG. 1, in the smartphone 1, the camera unit 41 is mounted on the same surface as the display and input unit 20. However, the mounting position of the camera unit 41 is not for limitation purposes. The camera unit 41 may be mounted on the rear surface of the display and input unit 20, or a plurality of camera units 41 may be mounted. In a case where the plurality of camera units 41 are mounted, imaging may be performed by a single camera unit 41 by switching the camera unit 41 performing the imaging, or imaging may be performed using the plurality of camera units 41 at the same time.

In addition, the camera unit 41 can be used in various functions of the smartphone 1. For example, the image obtained by the camera unit 41 can be displayed on the display panel 21, or the image of the camera unit 41 can be used as an operation input of the operation panel 22. In addition, in the detection of the position by the GPS reception unit 70, the position can be detected with reference to the image from the camera unit 41. Furthermore, with reference to the image from the camera unit 41, a determination of the optical axis direction of the camera unit 41 of the smartphone 1 and a determination of the current usage environment can be performed without using the 3-axis acceleration sensor or along with the 3-axis acceleration sensor. The image from the camera unit 41 can also be used in the application software.

Besides, the image data of the still picture or the motion picture can be recorded in the storage unit 50 or output through the external input-output unit 60 or the wireless communication unit 10 by adding the positional information obtained by the GPS reception unit 70, voice information (may be text information obtained by performing voice-to-text conversion by the main control unit or the like) obtained by the microphone 32, attitude information obtained by the motion sensor unit 80, and the like to the image data.

Figure 3:
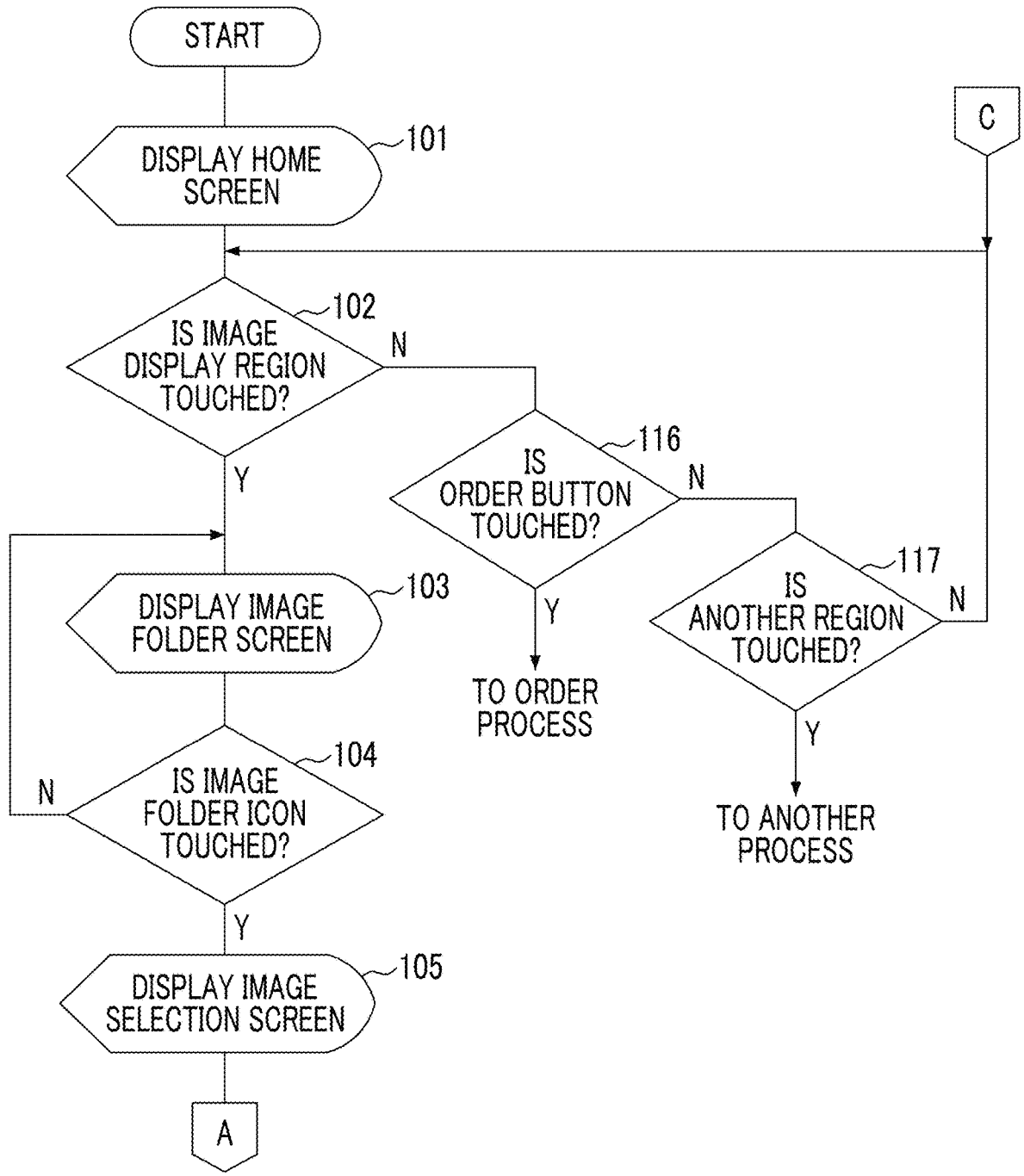
FIG. 3 is a flowchart illustrating a process procedure of the smartphone.
Figure 4:
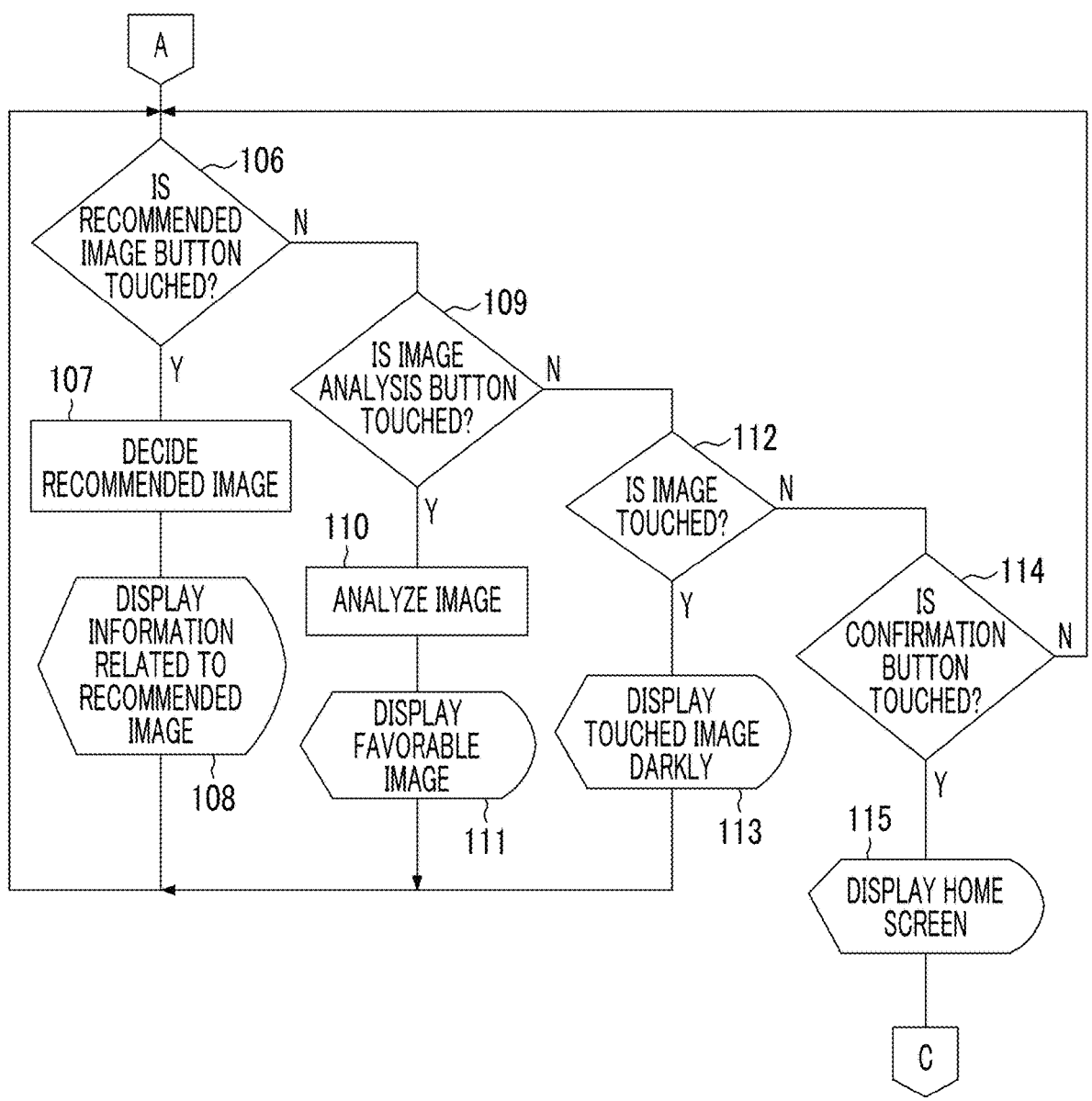
FIG. 4 is a flowchart illustrating a process procedure of the smartphone.

FIG. 3 and FIG. 4 are flowcharts illustrating a process procedure of the smartphone 1.

A program obtained through the Internet or the like is installed in advance on the smartphone 1. The process illustrated in FIG. 3 and FIG. 4 starts by starting the program. In addition, the program may be stored in a recording medium such as the external storage unit 52, and the program read from the external storage unit 52 may be installed on the smartphone 1. The program performs a process of selecting an image to be printed from images captured in a certain month. Particularly, a process of notifying the user of an image recommended as the image to be printed from the images captured in a certain month is performed.

Figure 5:
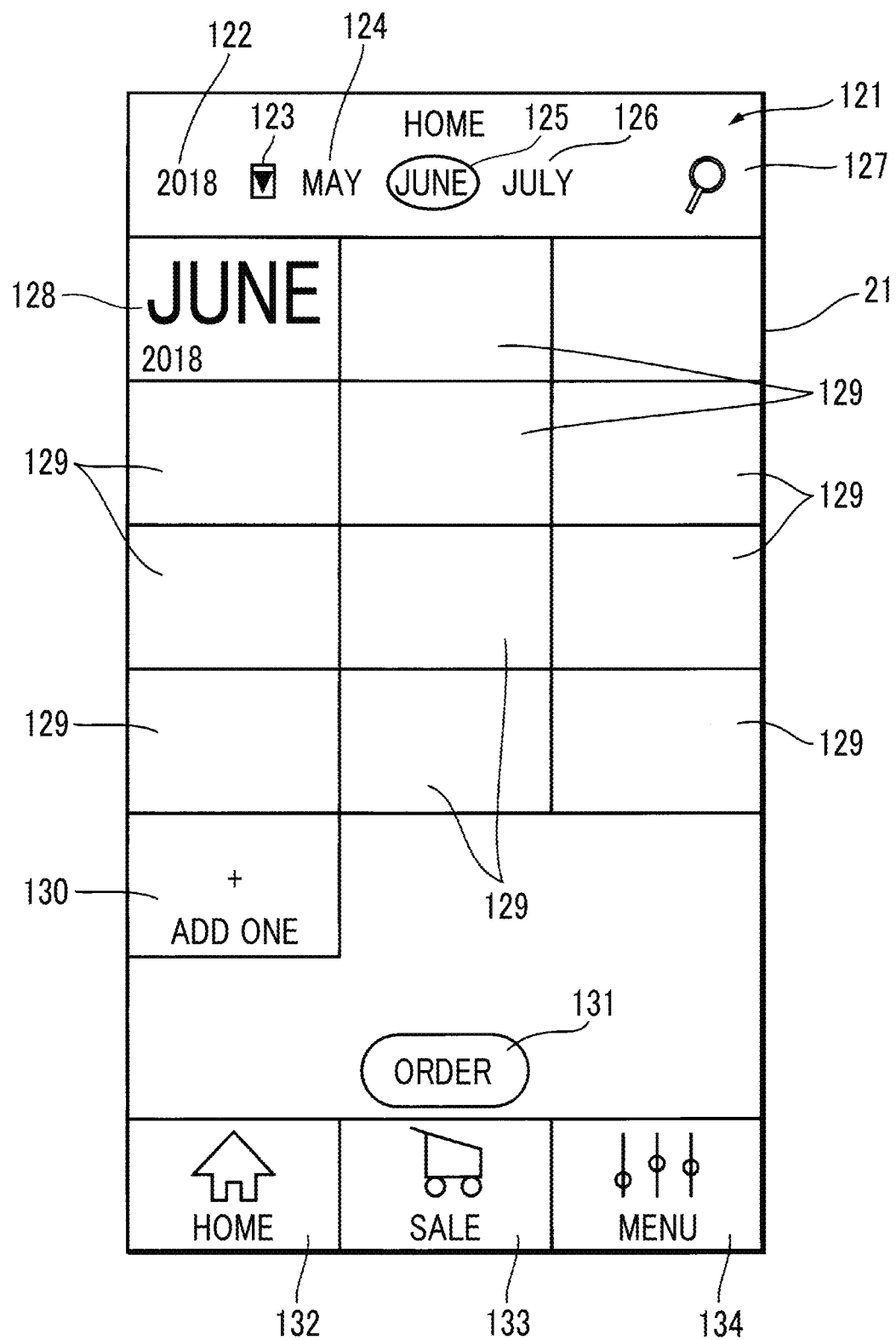
FIG. 5 is one example of a screen displayed on a display panel of the smartphone.

In a case where the program starts, a home screen illustrated in FIG. 5 is displayed on the display panel 21 of the smartphone 1 (step S101).

Eleven image display regions 129 are formed almost throughout the home screen (the number of image display regions 129 may be less than 11 or greater than or equal to 12). An imaging month display region 128 is displayed in almost the upper left portion of the home screen. The imaging month display region 128 displays a text string "June" and a text string "2018". The imaging month display region 128 of the home screen after the start of the program displays the year and month corresponding to the time of the start of the program. In the home screen illustrated in FIG. 5, the program is started in June 2018.

An imaging year and month specifying region 121 is formed in the upper portion of the home screen. An imaging year display region 122 and a pull-down button 123 are formed in the imaging year and date specifying region 121. By pulling down the pull-down button 123, a pull-down menu is shown, and the user can select a desired imaging year. Imaging month specifying regions 124, 125, and 126 are formed on the right side of the imaging year display region 122. By scrolling the imaging year and month specifying region 121 to the left and the right, months displayed in the imaging month specifying regions 124, 125, and 126 are switched. In the home screen illustrated in FIG. 5, the imaging month specifying regions 124, 125, and 126 display "May", "June", and "July", respectively. The text string "June" displayed in the imaging month specifying region 125 at the center is surrounded. By surrounding "June", it is shown that "June" is selected as a month in which an image displayed in the image display region 129 is captured. A search button 127 is formed on the right side of the imaging month specifying region 125. An image addition region 130 is formed on the lower left side of the image display region 129. By touching the image addition region 130, the number of image display regions 129 displayed on the home screen is increased by one.

An order button 131 on which a text string "order" is displayed is displayed in the lower portion of the home screen. The order button 131 is touched in the case of ordering a print of the image. In addition, a home button 132 on which a text string "home" is displayed, a sale button 133 on which a text string "sale" is displayed, and a menu button 134 on which a text string "menu" is displayed are formed in the lowermost portion of the home screen.

In a state where an image is not selected, an image is not displayed in the image display region 129. In a state where an image is not displayed, in a case where any image display region 129 of the 11 image display regions 129 is touched (YES in step S102), the display panel 21 displays an image folder screen illustrated in FIG. 6.

Figure 6:
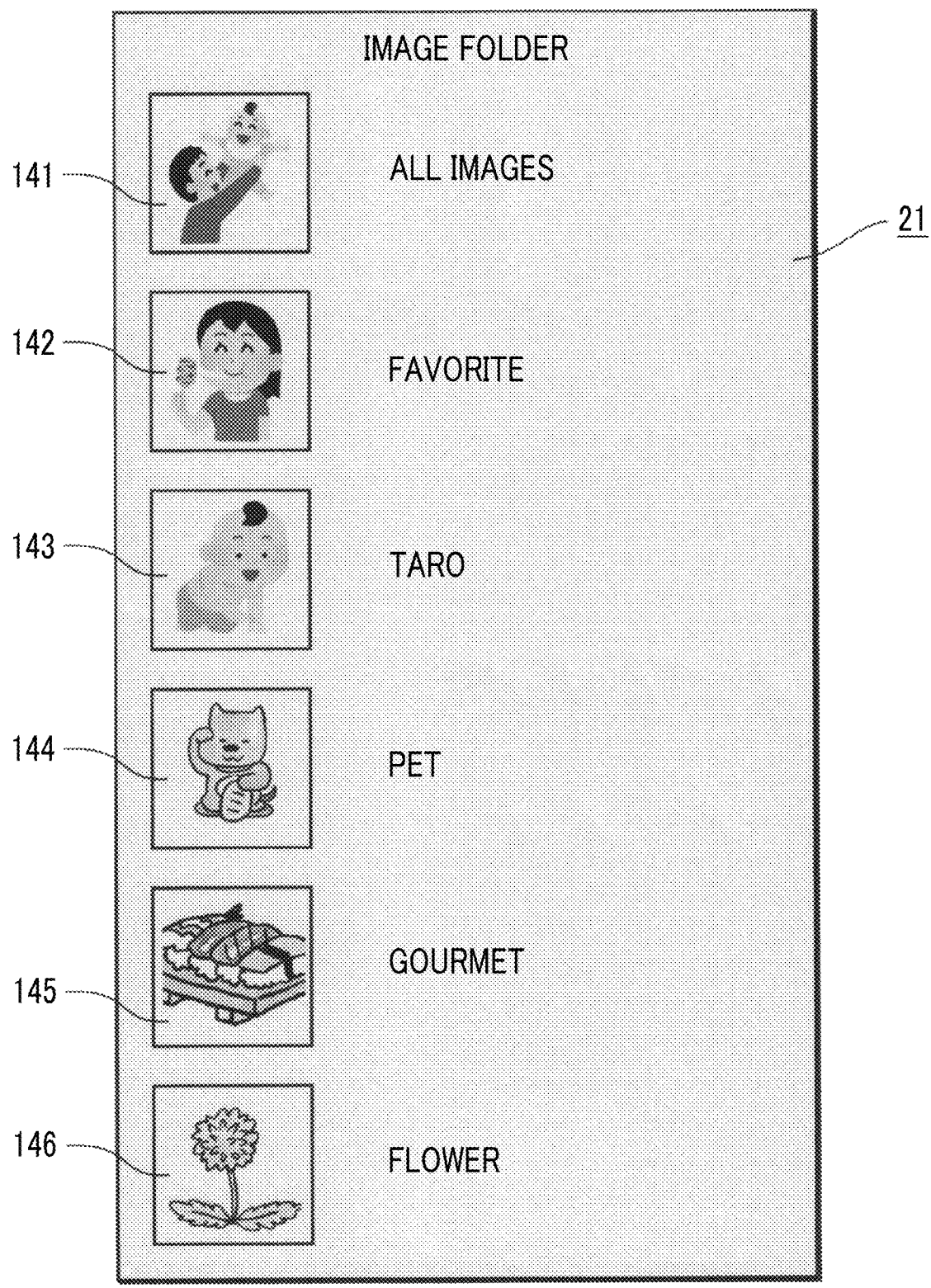
FIG. 6 is one example of the screen displayed on the display panel of the smartphone.

FIG. 6 is one example of the image folder screen displayed on the display panel 21.

The image folder screen displays image folder icons 141 to 146. A folder name is displayed on the right side of each of the image folder icons 141 to 146. The image folder icon 141 represents an image folder storing all images captured in a certain month (in the example illustrated in FIG. 6, June 2018). The other image folder icons 142 to 146 represent icons of image folders generated by the user among the images captured in the month. In a case where an image folder icon other than the image folder icons 141 to 146 displayed on the display panel 21 is present, the image folder icon not displayed on the display panel 21 is displayed on the display panel 21 by scrolling the surface of the display panel 21. In the example, it is assumed that only the image folder icons 141 to 146 are generated. In a case where any image folder icon of the image folder icons 141 to 146 is touched (YES in step S104), an image selection screen is displayed on the display panel 21 (step S105). An image stored in the image folder specified by the touched image folder icon is displayed on the display panel 21.

Figure 7:
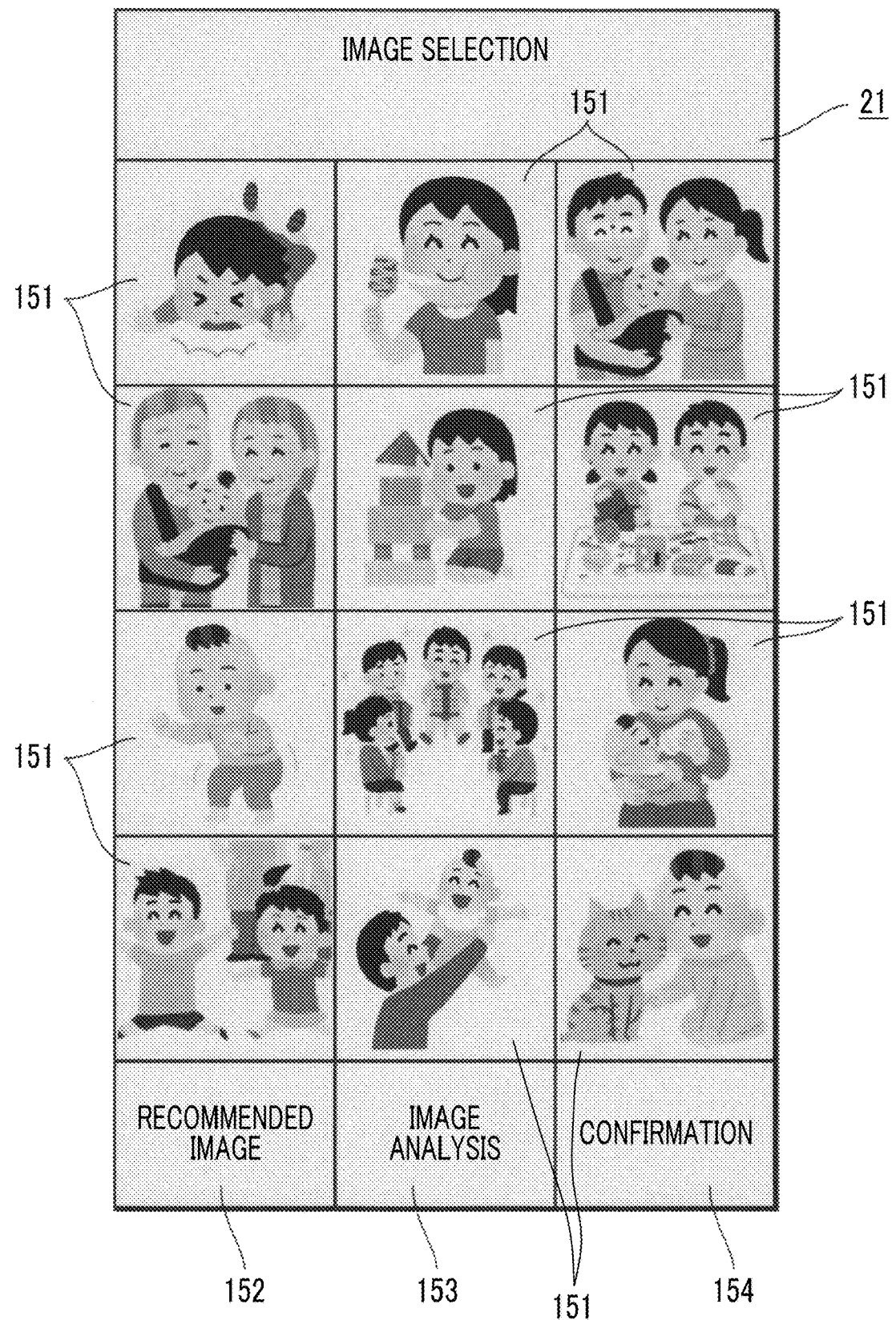
FIG. 7 is one example of the screen displayed on the display panel of the smartphone.

FIG. 7 is one example of the image selection screen displaying a list of images stored in the image folder specified by the touched image folder icon.

The image selection screen displays multiple image display regions 151. Images are displayed in the image display regions 151. In a case where an image not displayed on the display panel 21 is present, the image not displayed on the display panel 21 is displayed on the display panel 21 by scrolling the screen of the display panel 21.

A recommended image button 152 on which a text string "recommended image" is displayed, an image analysis button 153 on which a text string "image analysis" is displayed, and a confirmation button 154 on which a text string "confirmation" is displayed are formed in the lower portion of the image selection screen. The recommended image button 152 is touched in the case of notifying the user of information (one example of first information) related to the image recommended as the image to be selected by the user based on a tendency of previously selected images. The image analysis button 153 is touched in the case of notifying the user of an image determined as having a good quality by analyzing the image. The confirmation button 154 is touched in the case of confirming the image to be printed.

In a case where the recommended image button 152 is touched (YES in step S106), a recommended image decision process is performed (step S107).

Figure 8:
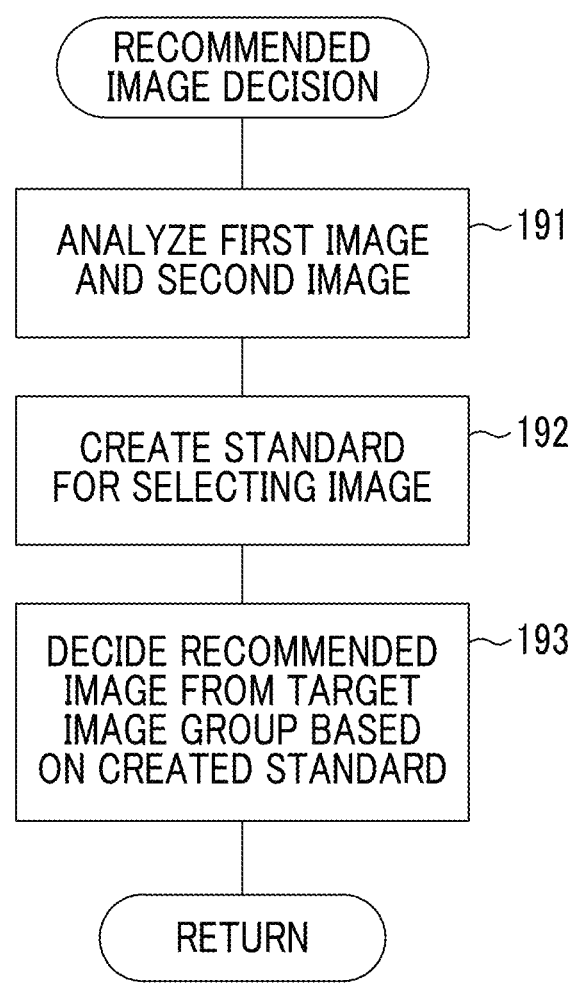
FIG. 8 is a flowchart illustrating a recommended image decision process procedure.

FIG. 8 is a flowchart illustrating the recommended image decision process procedure.

In the example, one or a plurality of images (one example of one or a plurality of first images; the internal storage unit 51 also stores which image is selected) selected as the image to be printed from an image group (one example of a first image group; stored in the internal storage unit 51) as a group of images captured in April 2018, one or a plurality of images (one example of one or a plurality of second images; stored in the internal storage unit 51 including which image is selected) selected as the image to be printed from an image group (one example of a second image group; stored in the internal storage unit 51) as a group of images captured in May 2018, and an image recommended as the image to be printed from an image group (one example of a target image group; stored in the internal storage unit 51) as a group of images captured by the camera unit 41 (one example of image group input means) in June 2018 are decided. While the recommended image is decided from the images captured in June 2018 based on images captured in two months including the images captured in April 2018 and the images captured in May 2018, the recommended image may be decided from the images captured in June 2018 based on not only the images captured in two months including April 2018 and May 2018 but also images selected from one or a plurality of months before March 2018. The recommended image of the image to be printed may be decided from images captured in a specific month based on an image selected as the image to be printed from each image group captured in a plurality of months. In addition, the image group as the group of images may not necessarily be in monthly units and may be regarded as a group of a plurality of images. The imaging time period of the first image group (included images), the imaging time period of the second image group (included images), and the imaging time period of the target image group are preferably different but may not be different.

Each of the first image selected from the first image group as the group of images captured in April 2018 and the second image selected from the second image group as the group of images captured in May 2018 is analyzed by the main control unit 100 of the smartphone 1 (step S191).

Figure 9:
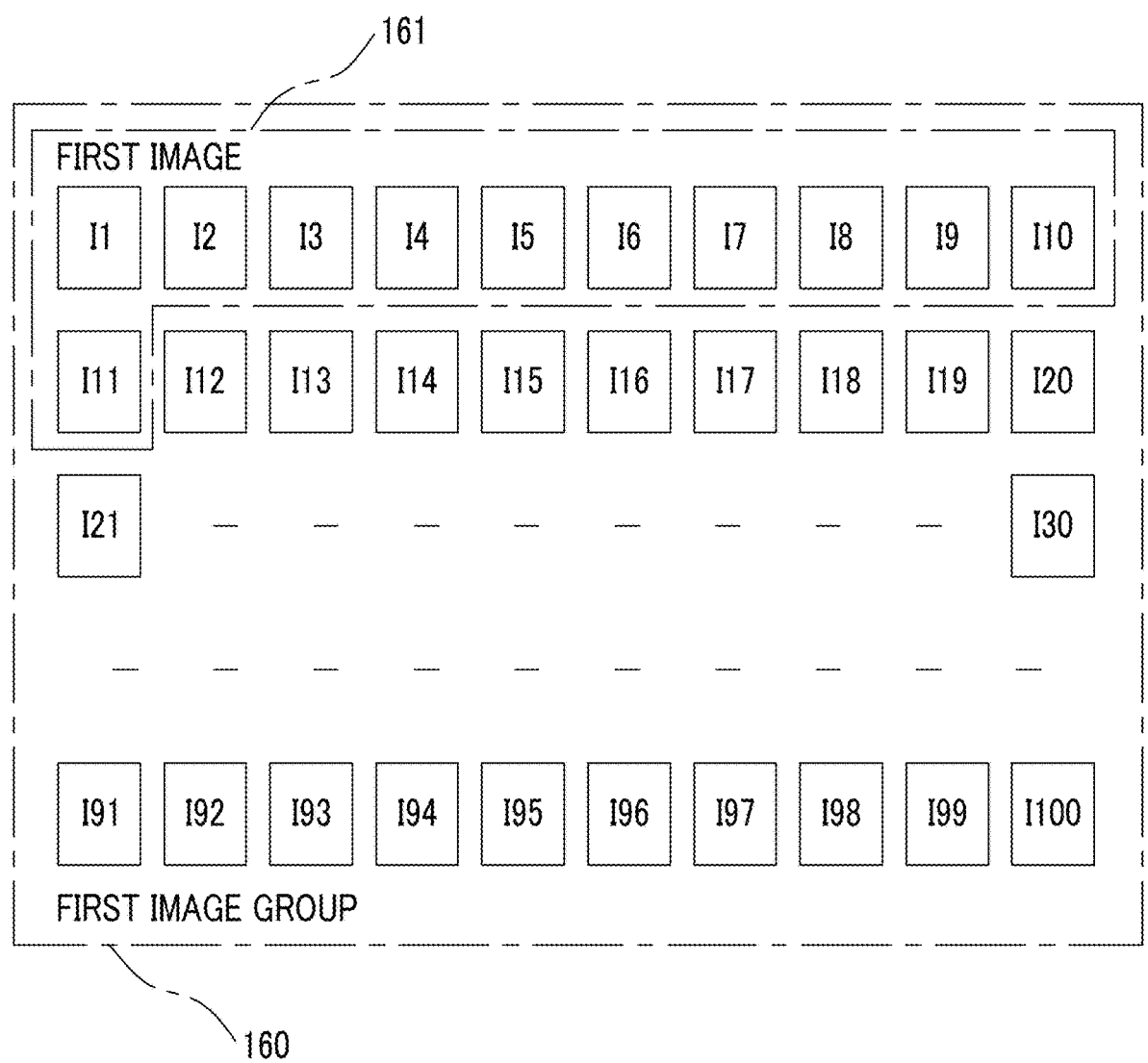
FIG. 9 is one example of a first image group.

FIG. 9 illustrates a first image group 160 as the group of images captured in April 2018 and a first image 161 selected from the first image group 160.

The first image group 160 includes an image I1 to an image I100, and 100 images are captured in April 2018. It is assumed that 11 images including the image I1 to the image I11 are selected as the first image 161 from the image I1 to the image I100.

Figure 10:
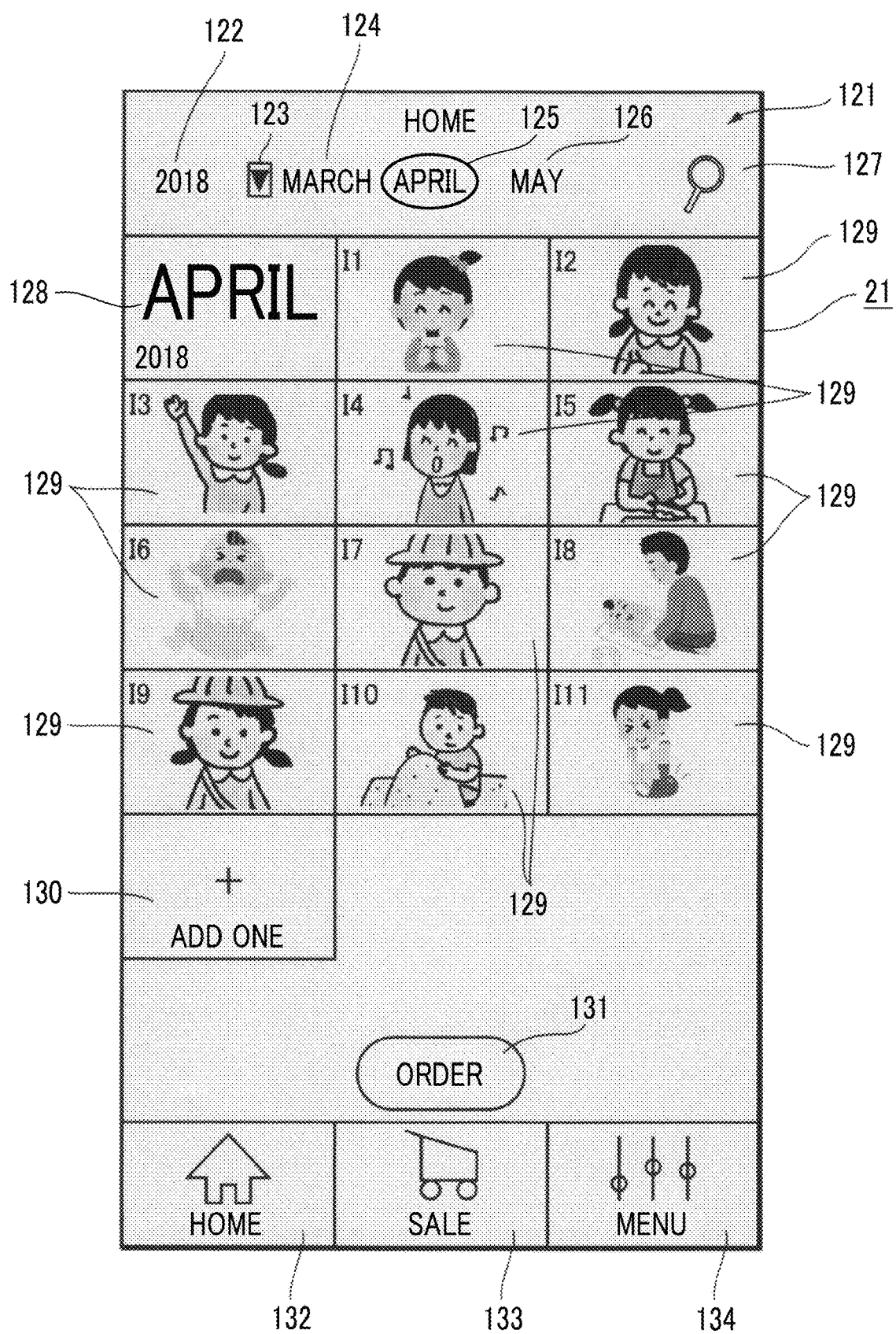
FIG. 10 is one example of the screen displayed on the display panel of the smartphone.

FIG. 10 illustrates the display panel 21 when the image to be printed is selected from the images captured in April 2018.

The 11 image display regions 129 formed in the display panel 21 display the images I1 to I11 included in the first image 161 selected from the first image group 160. Text strings of I1 to I11 are displayed in the image display region 129 for easy understanding, but the text strings of I1 to I11 may not necessarily be displayed.

Figure 11:
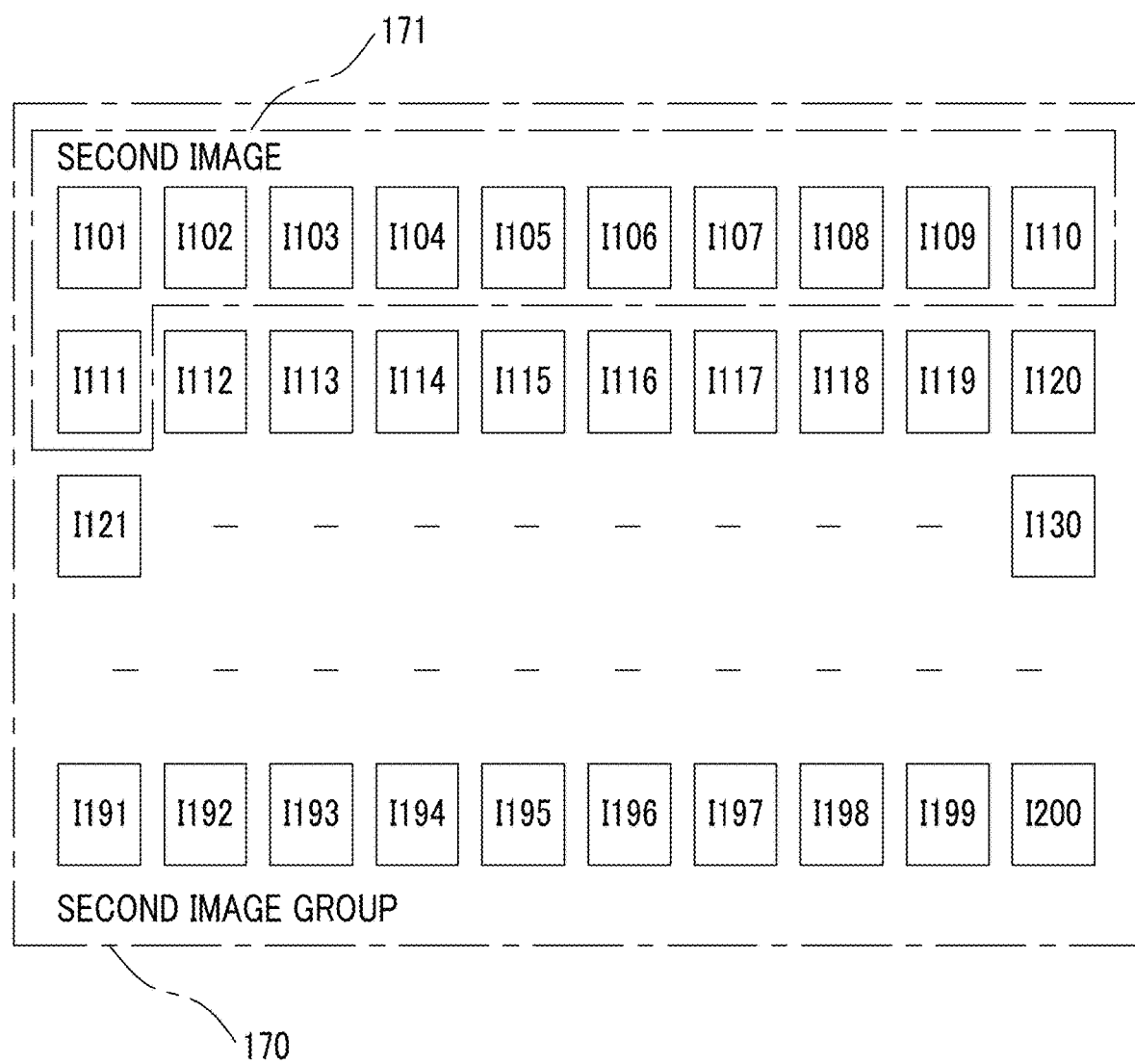
FIG. 11 is one example of a second image group.

FIG. 11 illustrates a second image group 170 as the group of images captured in May 2018 and a second image 171 selected from the second image group 170.

The second image group 170 includes an image I101 to an image I200, and 100 images are captured in May 2018. It is assumed that 11 images including the image I101 to the image I111 are selected as the second image 171 from the image I101 to the image I200.

Figure 12:
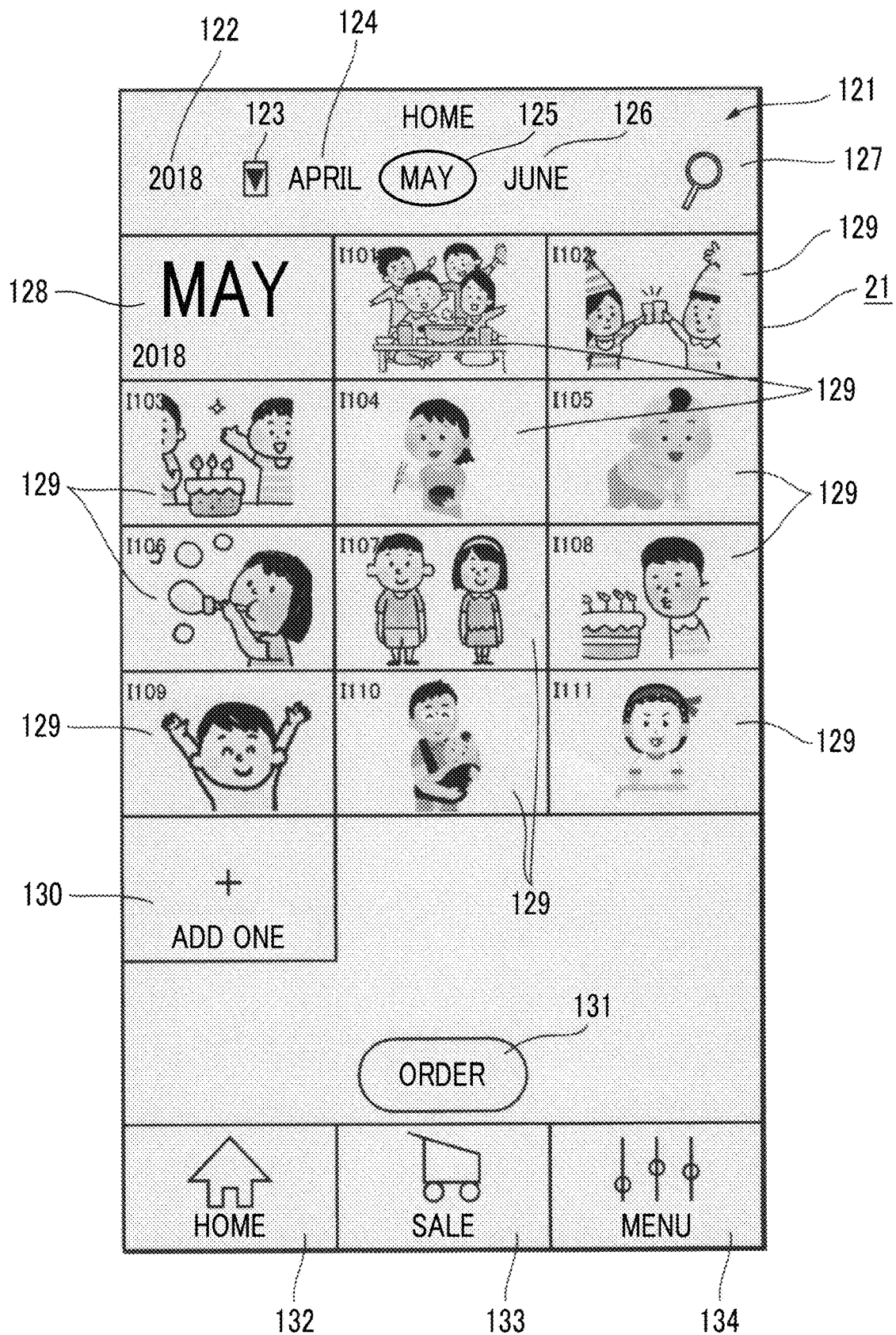
FIG. 12 is one example of the screen displayed on the display panel of the smartphone.

FIG. 12 illustrates the display panel 21 when the image to be printed is selected from the images captured in May 2018.

The 11 image display regions 129 formed in the display panel 21 display the images I101 to I111 included in the second image 171 selected from the second image group 170. Text strings of I101 to I111 are displayed in the image display region 129 for easy understanding, but the text strings of I101 to I111 may not necessarily be displayed.

Next, a standard for selecting the image is created by the main control unit 100 (one example of selection standard creation means) (step S192). Various standards are present including, for example, a standard created such that an image of which a similarity with the first image 161 or the second image 171 is higher than or equal to a threshold (one example of a first threshold) is decided as the recommended image among images included in a target image group 180. The standard may be created such that an image of which a similarity with both of the first image 161 and the second image 171 is higher than or equal to the threshold (one example of the first threshold) is decided as the recommended image.

Figure 13:
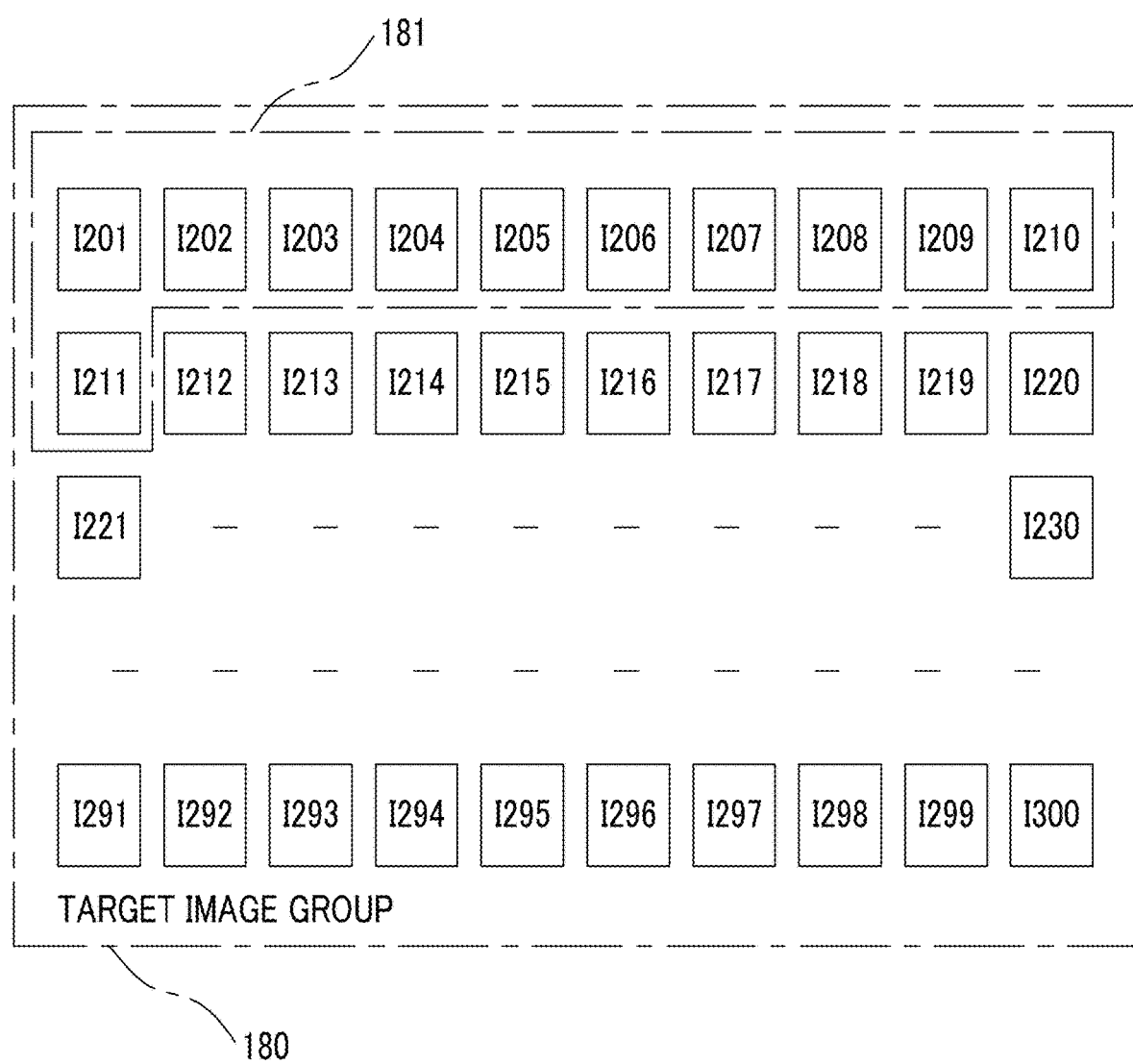
FIG. 13 is one example of a target image group.

FIG. 13 is one example of the images captured in June 2018.

It is assumed that 100 images I201 to I300 are captured in June 2018 and constitute an image group (one example of the target image group). In a case where images of which a similarity with the first image 161 or the second image 171 is higher than or equal to the threshold (one example of the first threshold) are 11 images including the images I201 to I211 among the images I201 to I300, the images I201 to I211 are decided as a recommended image 181 (step S193). The number of recommended images may be greater than or less than 11.

Figure 14:
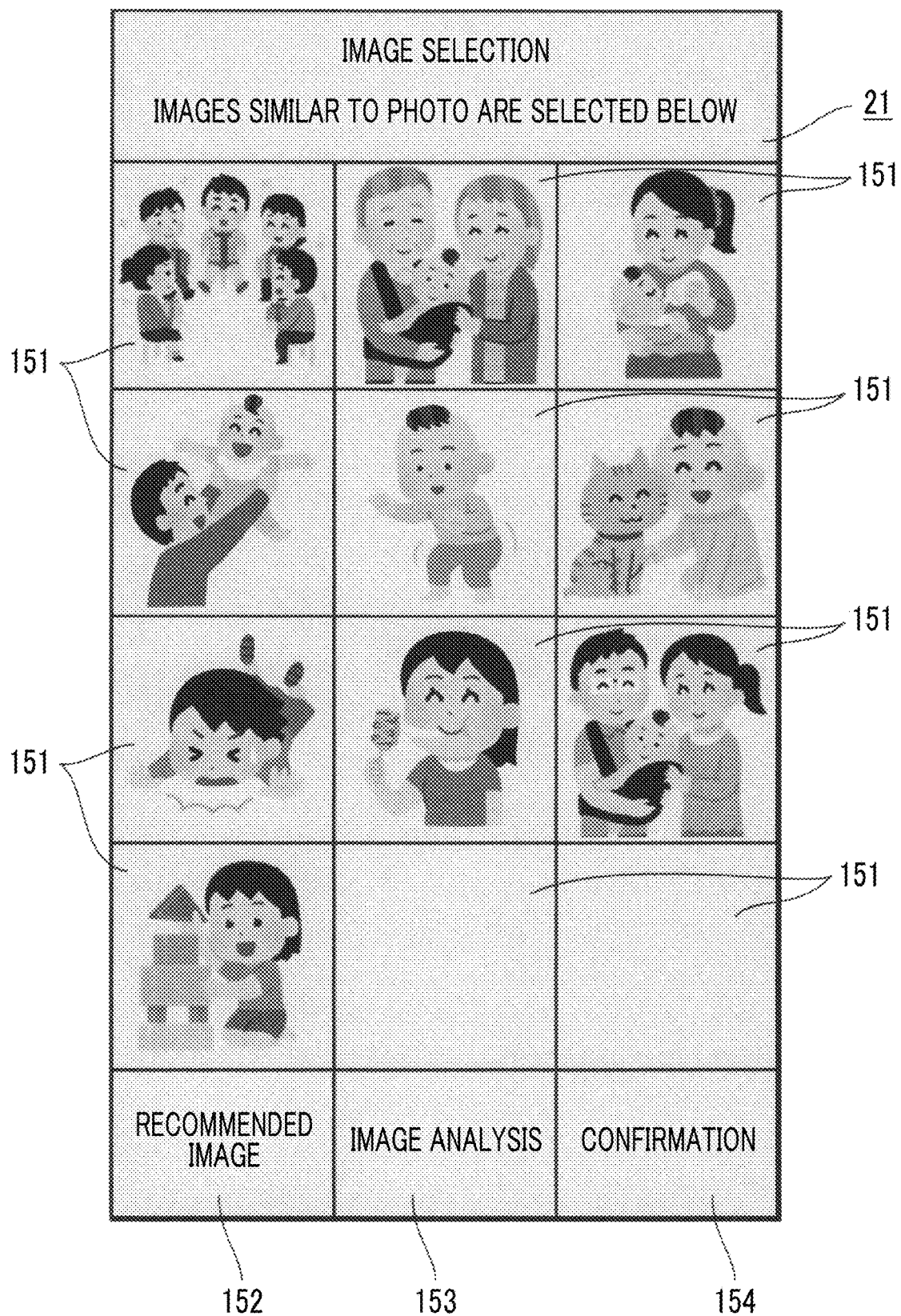
FIG. 14 is one example of the screen displayed on the display panel of the smartphone.

In a case where the recommended image is decided, the decided recommended image (one example of the first information) is displayed in the image display region 151 of the display panel 21 under control of the main control unit 100 (one example of first notification control means) as illustrated in FIG. 14. The recommended image is displayed in a distinguishing manner from other images. A text string "images similar to the photo are selected below" is displayed in the upper portion of the display panel 21. The user perceives that images similar to the previously selected image are displayed in the image display region.

Information related to the recommended image is displayed on the display panel 21 (step S108 in FIG. 4). Since the information related to the recommended information is obtained, the user can decide the image to be ordered with reference to the information.

Figure 15:
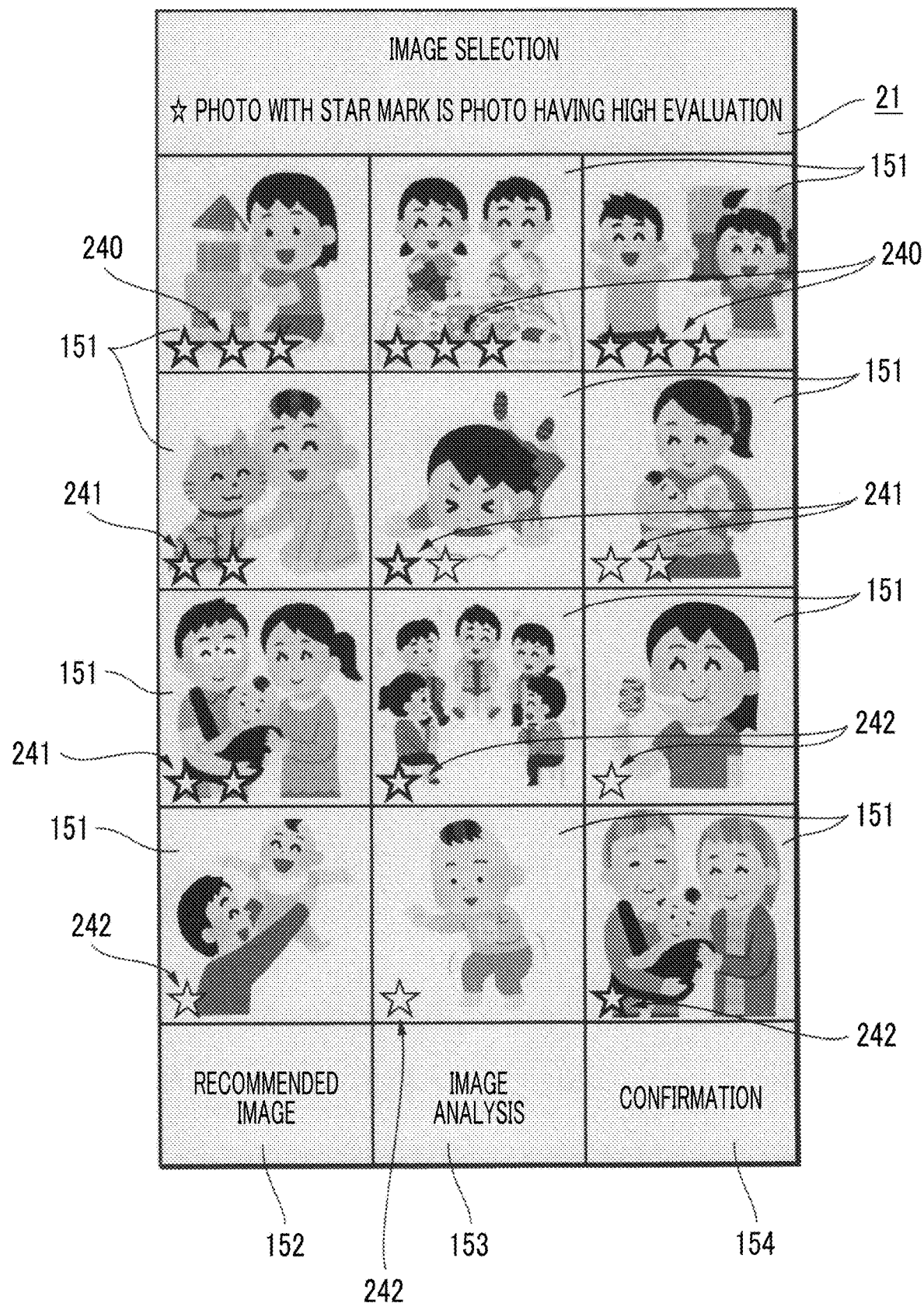
FIG. 15 is one example of the screen displayed on the display panel of the smartphone.

In a case where the recommended image button 152 is not touched (NO in step S106 in FIG. 4) and the image analysis button 153 is touched (YES in step S109 in FIG. 4), the main control unit 100 analyzes the target image group 180 (in this case, 100 images I201 to I300 captured in June 2018) (step S110 in FIG. 4). By the analysis, favorable images are found from the images I201 to I300 included in the target image group 180 and are displayed on the display panel 21 as illustrated in FIG. 15 (step S111 in FIG. 4). Favorable images are images having a high objective image evaluation and are determined as an image in focus, an image in which a main subject is positioned at the center, an image in which the size of the main subject is considered to be relatively appropriate, an image having a relatively correct composition, an image having appropriate brightness, and the like. The evaluations of those images are calculated based on the result of the image analysis.

With reference to FIG. 15, the images determined as favorable images are displayed in descending order of evaluation in the image display region 151 of the display panel 21. By scrolling the display panel 21, an image not displayed on the display panel 21 is displayed on the display panel 21. Star marks (may not be stars) 240 to 242 are displayed in the lower portion of each image displayed in the image display region 151. As the number of stars is increased, the evaluation of the image is increased. The user can select the image to be printed with reference to the star marks 240 to 242 and the like. Not only the star marks 240 to 242 and the like may be assigned to the images having a favorable result of the image analysis, but also a mark (one example of the first information) of a star or the like may be assigned to the recommended image based on the standard created from the first image 161 and the second image 171.

In a case where any of the images displayed in the image display region 151 is touched (YES in step S112 in FIG. 4), the touched image is more darkly displayed than the other images (step S113 in FIG. 4).

Figure 16:
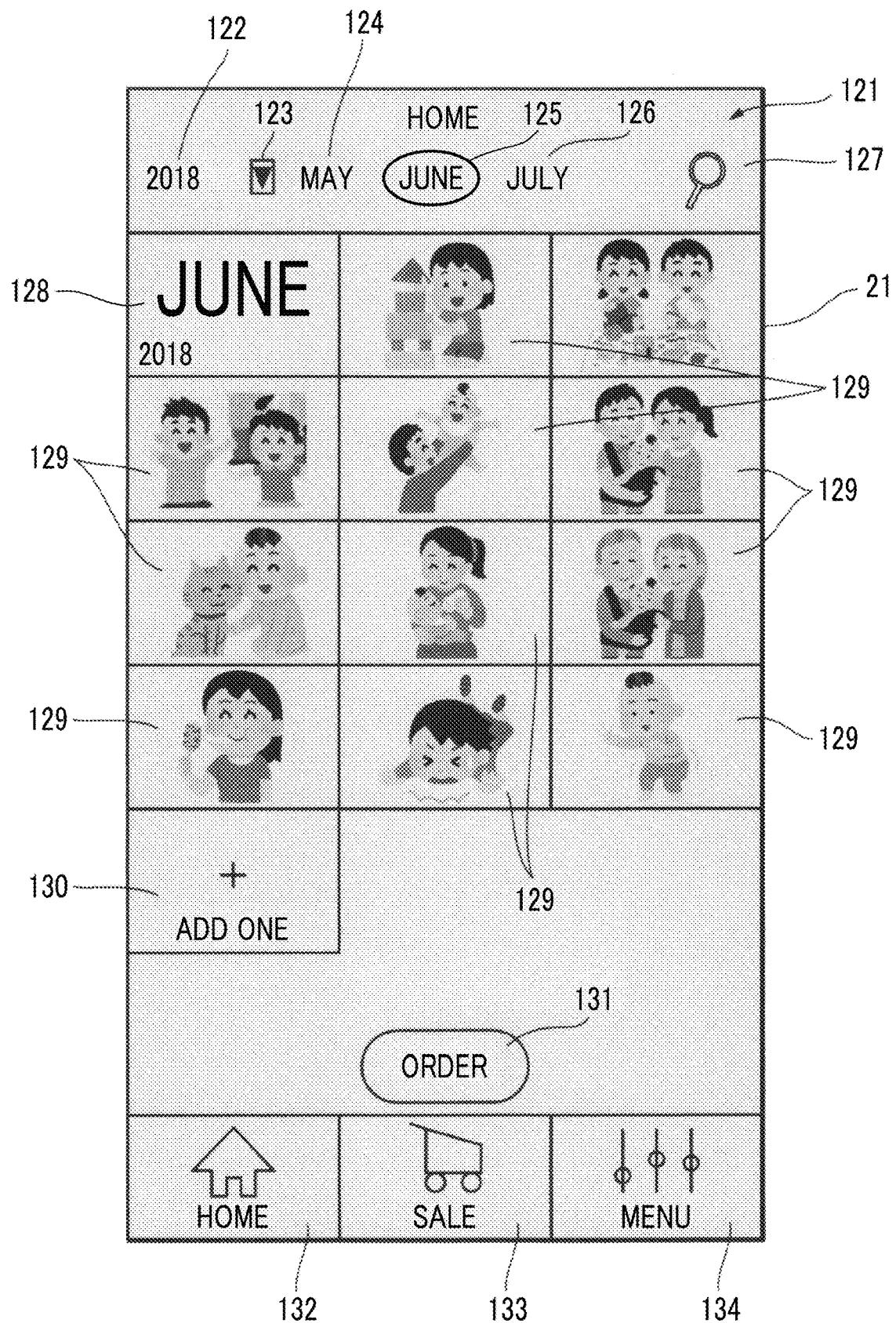
FIG. 16 is one example of the screen displayed on the display panel of the smartphone.

In a case where 11 images are touched and the confirmation button 154 is touched (YES in step S114 in FIG. 4), the home screen illustrated in FIG. 16 is displayed on the display panel 21 (step S115 in FIG. 4). The image display region 129 of the display panel 21 displays the images touched by the user.

In a case where the order button 131 of the home screen is touched (YES in step S116 in FIG. 3), image data representing each of the 11 images displayed in the image display region 129 is transmitted to an image server 280 (refer to FIG. 26) from the smartphone 1. The image is printed in the image server 280, and the print is sent to the user.

In a case where the order button 131 is not touched and another region is touched (YES in step S117 in FIG. 3), a process corresponding to the touched region is performed.

The user is notified of an image having common characteristics with the previously selected image as the recommended image. Thus, by selecting the image to be printed from the recommended image, a print of the image having common characteristics with the previously selected image is obtained.

In the above example, the standard for selecting the image is an image similar to the first image 161 selected from the first image group 160 or the second image 171 selected from the second image group 170 (step S192 in FIG. 8). However, the standard may be created such that an image having a theme (theme perceived from the main subject) obtained in common from the first image 161 and the second image 171 is selected.

For example, in a case where it is perceived from the image analysis that the image 18 of a child and a father captured together is selected from the images captured in April in 2018 as illustrated in FIG. 10, and the image I110 of a child and a father captured together is selected from the images captured in May 2018 as illustrated in FIG. 12, a standard for selecting an image having a theme of an "image of a child and a father captured together" is created. The common theme obtained from one image 18 of the first image 161 and one image I110 of the second image 171 is, for example, the "image of a child and a father captured together". However, the common theme may be a theme other than a common theme obtained from another image other than one image 18 of the first image 161 and another image other than one image I110 of the second image 171.

In addition, the theme obtained in common from the first image 161 and the second image 171 may be a theme obtained in common from the action of the main subject of each of the images I1 to I11 included in the first image 161 and the action of the main subject of each of the images I101 to I111 included in the second image 171.

In a case where the obtained theme is found, the user is notified such that an image matching the theme is recommended. Hereinafter, one example of the manner of the notification will be described.

Figure 17:
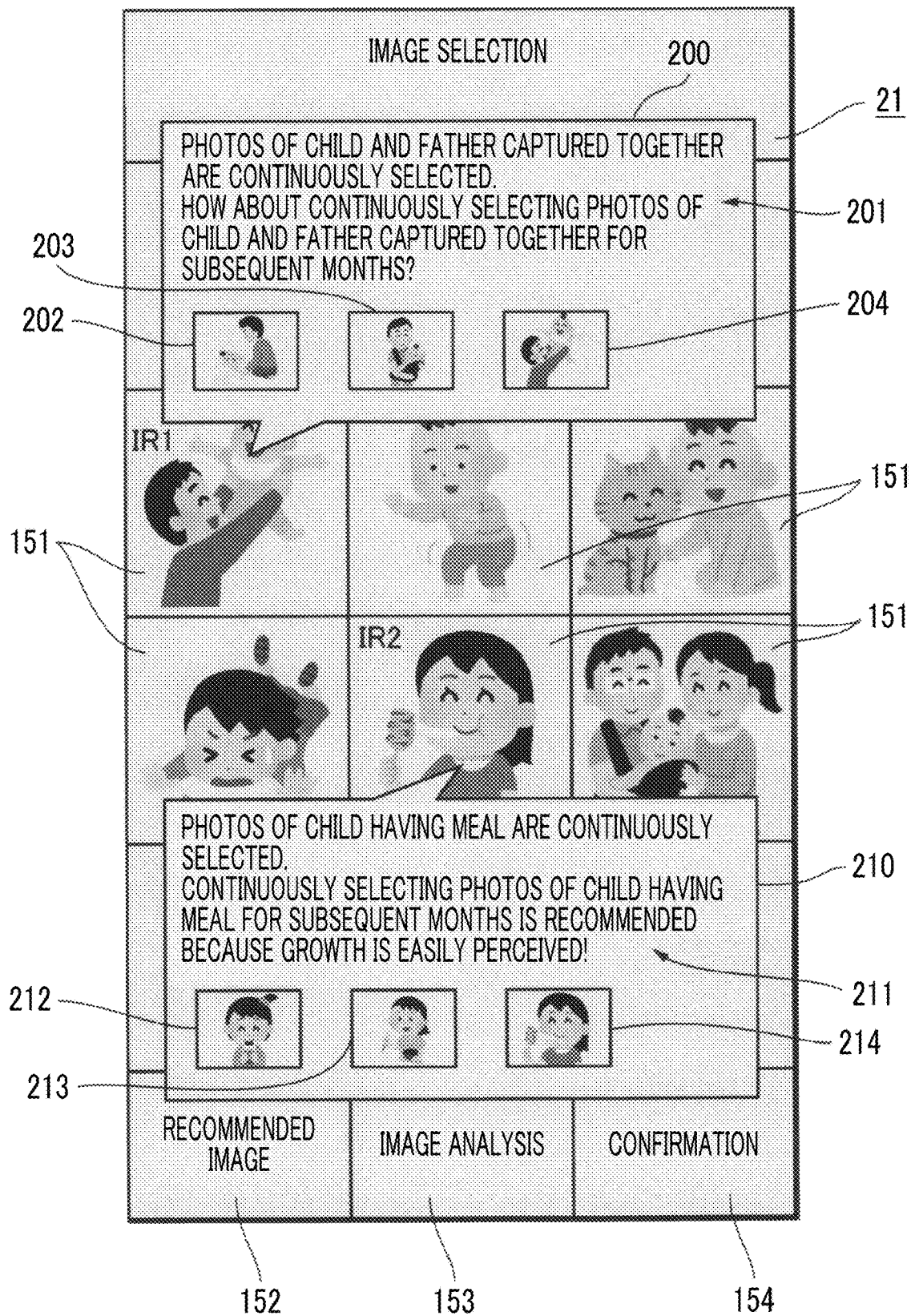
FIG. 17 is one example of the screen displayed on the display panel of the smartphone.

With reference to FIG. 17, in a case where the image matching the obtained theme is found from the target image group configured with the plurality of images captured in June 2018, information related to a recommendation of the image as the image to be selected is displayed on the display panel 21.

For example, in a case where the theme is the "image of a child and a father captured together" and the standard is created such that the image matching the theme is selected, the image matching the theme is displayed in the image display region in a case where the image matching the theme is present.

As illustrated in FIG. 17, in a case where an image IR1 matches the theme of the "image of a child and a father captured together", the image IR1 is displayed in the image display region 151. Furthermore, a speech balloon 200 for notification of the recommendation information (one example of the first information) is displayed in accordance with the image IR1. The speech balloon 200 displays a text string 201 indicating that since the "image of a child and a father captured together" is previously selected, selection of such an image is recommended. In addition, the speech balloon 200 displays selected image display regions 202 and 203 in which the previously selected image in the common theme is displayed. The selected image display region 202 displays an image having the theme of the "image of a child and a father captured together" in common among images selected in April 2018. The selected image display region 203 displays an image having the theme of the "image of a child and a father captured together" in common among images selected in May 2018. Furthermore, a recommended image display region 204 is formed in the speech balloon 200. The recommended image display region 204 displays the recommended image IR1 displayed in accordance with the speech balloon 200. The user can relatively simply select the "image of a child and a father captured together" and obtains the print of the image having the common theme each month.

Similarly, when an "image of a child having a meal" is obtained as the common theme as illustrated in the image I1 among the images selected in April 2018 as illustrated in FIG. 10 and the image I104 among the images selected in May 2018 as illustrated in FIG. 12, the theme is created as the standard.

As illustrated in FIG. 17, in a case where an image IR2 matching the theme of the "image of a child having a meal" is present among the images captured in June 2018, a speech balloon 210 is displayed in accordance with the image IR2. For example, whether or not a certain image is the "image of having a meal" can be decided by performing object recognition and detecting captured food or dish. The speech balloon 210 includes a text string 211 for recommending selection of the "image of a child having a meal". In addition, selected image display regions 212 and 213 are displayed. The selected image display region 212 displays the image I1 matching the theme of the "image of a child having a meal" among the images selected in April 2018. The selected image display region 213 displays the image I104 matching the theme of the "image of a child having a meal" among the images selected in May 2018. Furthermore, a recommended image display region 214 is formed in the speech balloon 210. The recommended image display region 214 displays the recommended image IR2 displayed in accordance with the speech balloon 210. The user can relatively simply select the "image of a child having a meal" and obtains the print of the image having the common theme each month.

For example, the standard based on the theme of the "image of a child and a father captured together" is obtained by calculating a similarity (one example of a first similarity) with both of any of the images I1 to I11 selected in April 2018 and illustrated in FIG. 10 and any of the images I101 to I111 selected in May 2018 for all images included in the target image group captured in June 2018, and setting an image of which the calculated similarity is higher than or equal to the threshold (one example of the first threshold) as the recommended image. By creating such a standard, the image IR1 of which the similarity with any of the image 18 and the image I110 is higher than or equal to the threshold is found from the images captured in June 2018. Similarly, by creating the standard based on the theme of the "image of a child having a meal", the image IR2 of which the similarity with any of the image I1 selected in April 2018 and the image I104 of a child having a meal is higher than or equal to the threshold (one example of the first threshold) is found from the images captured in June 2018.

Figure 18:
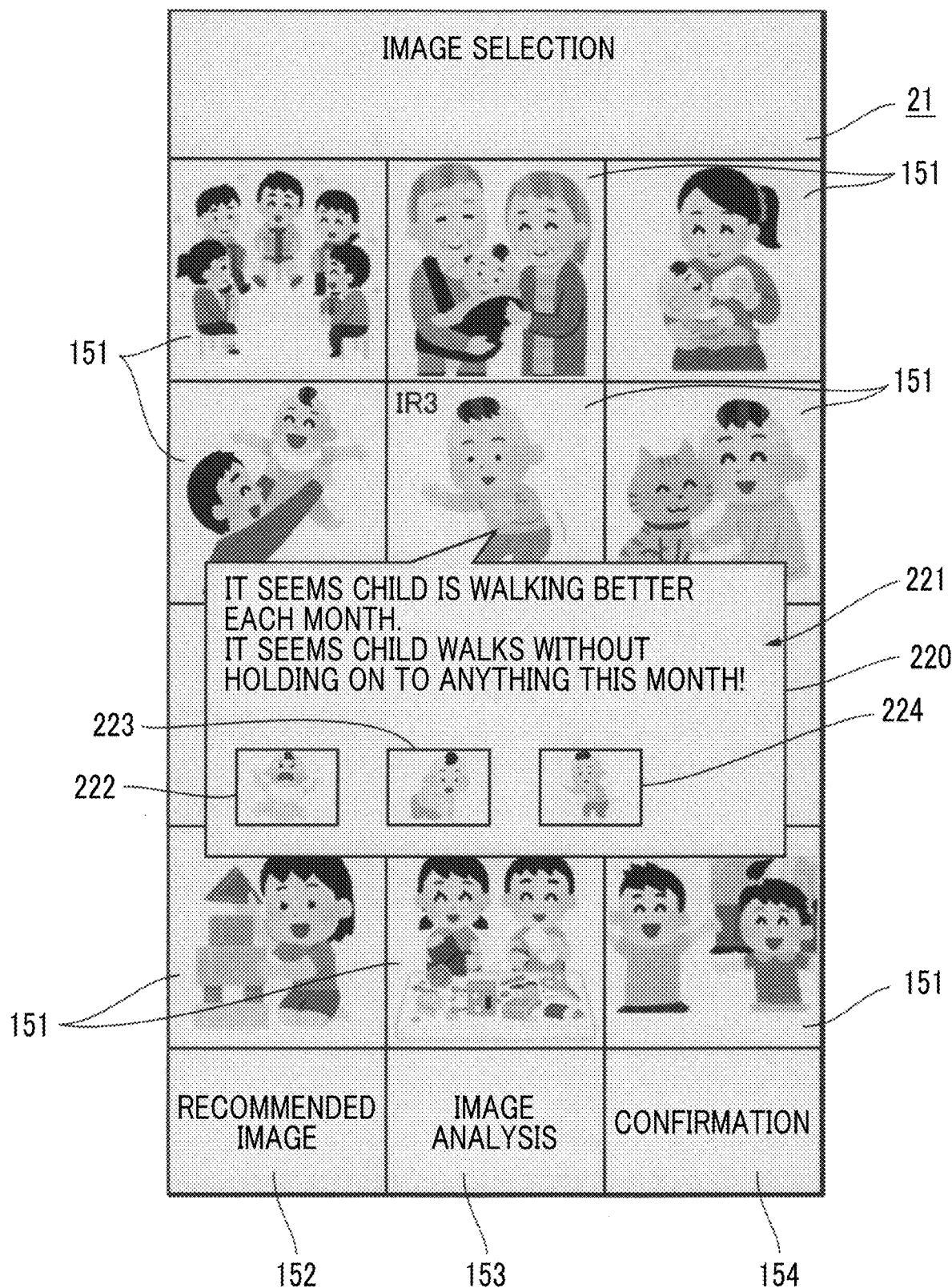
FIG. 18 is one example of the screen displayed on the display panel of the smartphone.

FIG. 18 is one example of the image displayed on the display panel 21.

FIG. 18 is an example of deciding the recommended image based on a standard such that an image showing a change in common subject is set as the recommended image.

In the example illustrated in FIG. 10, the image 16 of a child is selected among the images captured in April 2018. In the example illustrated in FIG. 12, the image I105 in which the same child as the child captured in the image 16 is captured is selected among the images captured in May 2018. In a case where an image IR3 in which the same child (one example of the common subject) as the child (main subject) common in the selected images 16 and I105 is captured is present among the images captured in June 2018, the image IR3 is set as the recommended image. A speech balloon 220 is displayed in correspondence with the image IR3. The speech balloon 220 displays a text string 221 indicating an "image showing growth of a child". The speech balloon 220 displays selected image display regions 222 and 223 in the same manner as the speech balloons 200 and 210. The selected image display region 222 displays the image 16 matching the theme of the "image showing growth of a child" among the images selected in April 2018. The selected image display region 223 displays the image I105 matching the theme of the "image showing growth of a child" among the images selected in May 2018. Furthermore, a recommended image display region 224 is formed in the speech balloon 220. The recommended image display region 224 displays the recommended image IR3 displayed in accordance with the speech balloon 220. The user can relatively simply select the "image showing growth of a child" and obtains the print of the image having the common theme each month. The "image showing growth of a child" may be determined as the "image showing growth of a child" by detecting a specific image such as an "image of a child turning over", an "image of a crawling child", and an "image of a child standing by holding on to things" in advance. Accordingly, an image having common characteristics such as showing growth of a child can be more accurately set as the recommended image.

An abstract concept such as the "image showing growth of a child" may be determined using a separate learned model. As one example, in a generally used image search engine, a model for determining the "image showing growth of a child" can be learned by handling an image extracted by entering a keyword such as "child, growth, image" as a correct image of the "image showing growth of a child". As another example, in the program of the present example, a model for determining the "image showing growth of a child" can be learned by causing the user to input a text message summarizing an image group in the month at the time of the order, setting order information related to all users as a search population, and handling an image in the month in which a text message including words of "child, growth, image" as a correct image of the "image showing growth of a child".

Figure 19:
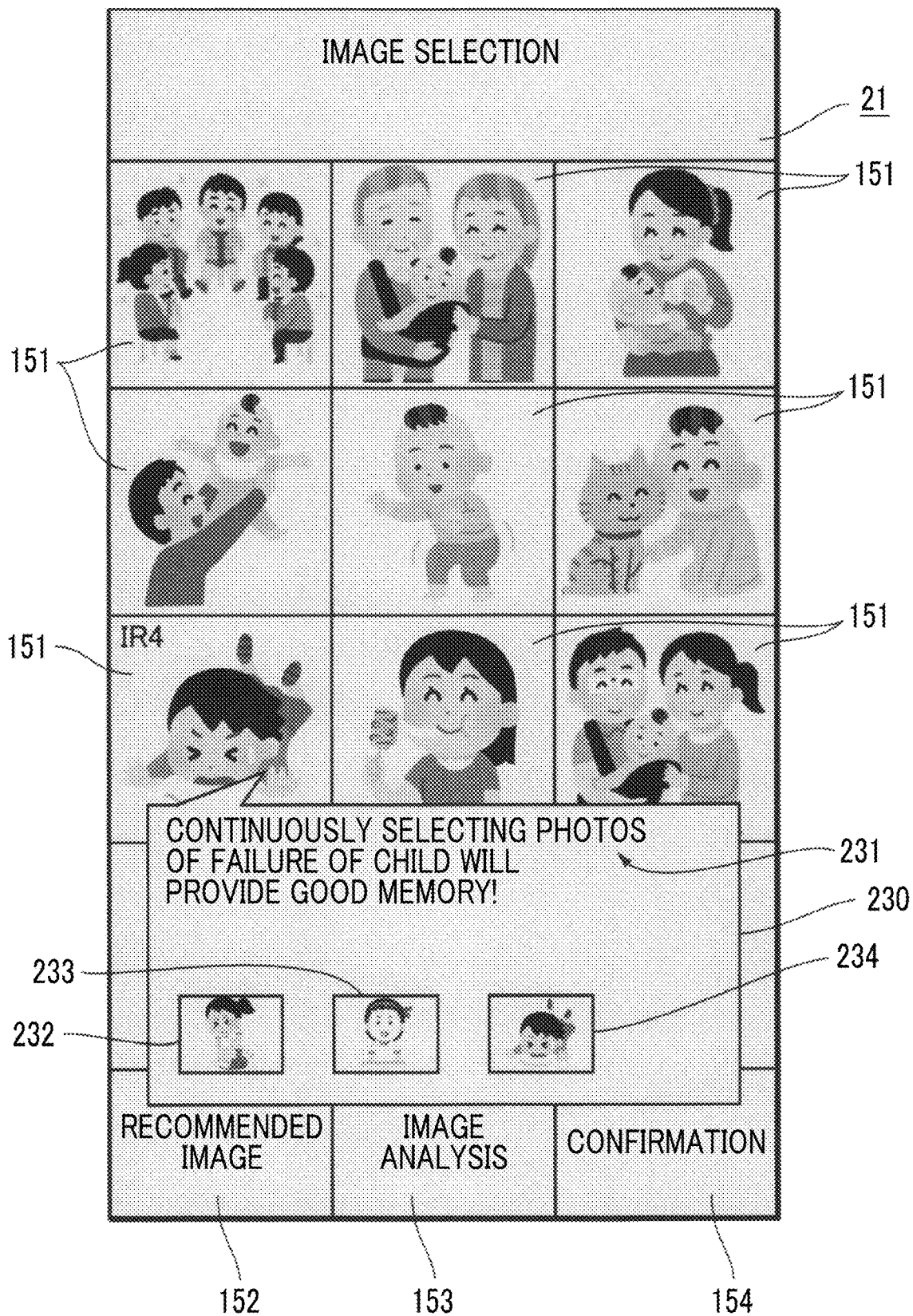
FIG. 19 is one example of the screen displayed on the display panel of the smartphone.

FIG. 19 is one example of the image displayed on the display panel 21.

The example illustrated in FIG. 19 is one example of a speech balloon 230 displayed on the display panel 21 in a case where it is considered that an image of failure is selected each month. The image of failure includes an image in which the subject itself is captured in a state not preferred by the subject such as "tripping" or "face with tears".

In a case where the image I11 of a failing child is included in the images selected in April 2018 as illustrated in FIG. 10 and the image I111 of a failing child is included in the images selected in May 2018 as illustrated in FIG. 12, a text string 231 for recommending selection of the image of failure is displayed in the speech balloon 230. In the same manner as described above, the speech balloon 230 displays selected image display regions 232 and 233, and the selected image display regions 232 and 233 display the previously selected images I11 and I111 of a failing child. In addition, a recommended image display region 234 is formed in the speech balloon 230. The recommended image display region 234 displays a recommended failure image IR4 displayed in accordance with the speech balloon 230. By including the image of a failure of a child in a part of images selected each month, the user can recall and miss the action of the child and regard other images as being more precious. The user can select a more preferable image.

Figure 20:
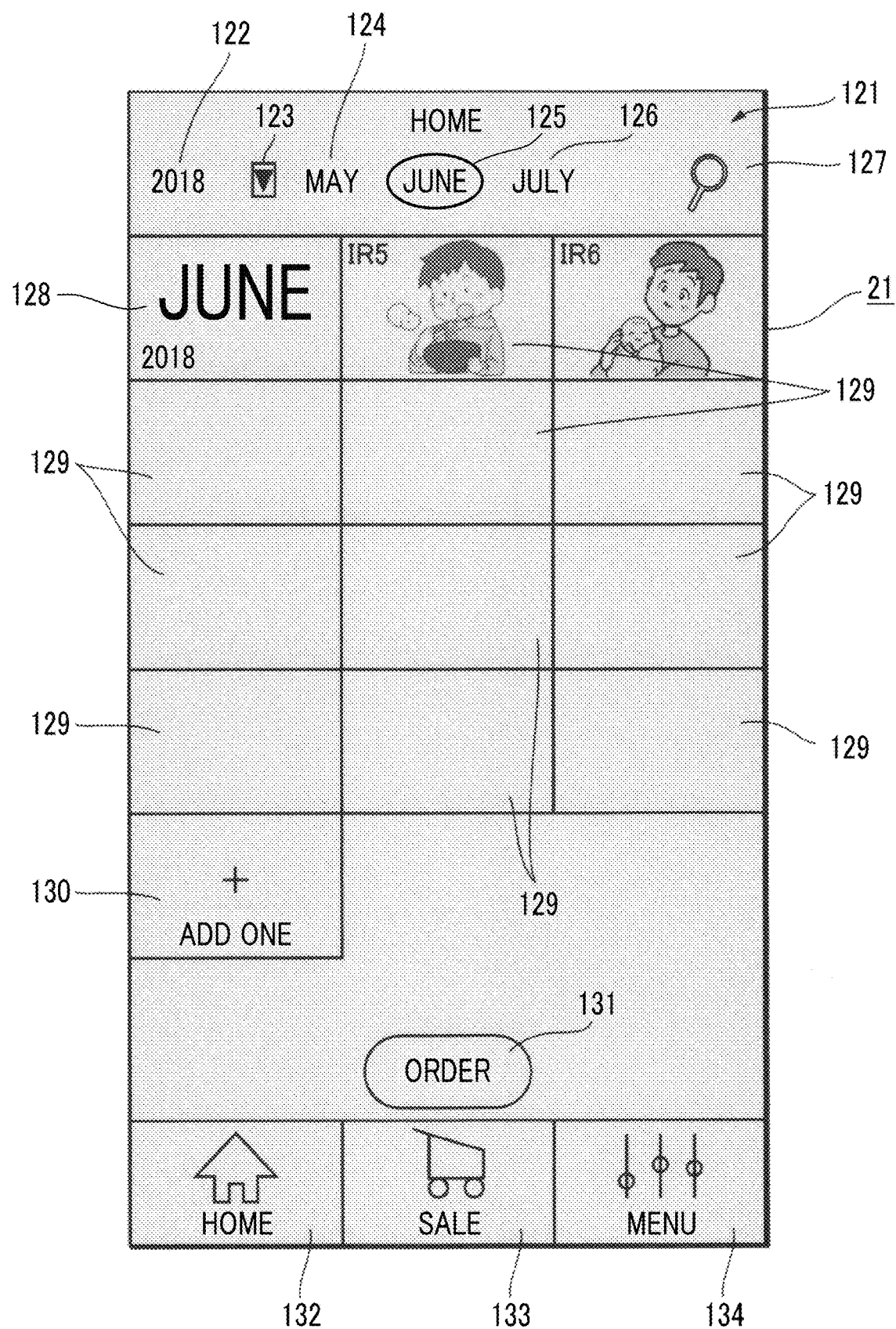
FIG. 20 is one example of the screen displayed on the display panel of the smartphone.

FIG. 20 is one example of the home screen displayed on the display panel 21.

In a case where the home screen is displayed in step S101 illustrated in FIG. 3, icons IR5 and IR6 (one example of a sample image) are displayed in the image display region 129 included in the display panel 21 illustrated in FIG. 20. The icon IR5 is an icon illustrating a child having a meal. The icon IR6 is an icon illustrating a child and a father being together. By seeing the icons IR5 and IR6 (one example of the first information), the user perceives that an image of a child having a meal and an image of a child and a father being together are recommended among the images captured in June 2018. By starting the program, the common theme is detected by analyzing the images I1 to I11 selected among the images captured in April 2018 and the images I101 to I111 selected among the images captured in May 2018, and the icons IR5 and IR6 corresponding to the detected theme are displayed in the image display region 129. Instead of the icons IR5 and IR6, a sample image of a child having a meal and a sample image of a child and a father being together may be displayed in the image display region 129, or text strings such as "image of a child having a meal is recommended" and "image of a child and a father being together is recommended" may be displayed.

Furthermore, the standard may be created such that an image having a common theme of the themes of all previously selected images, for example, a theme obtained in common from a first theme obtained from the images I1 to I11 selected from the images captured in April 2018 and a second theme obtained from the images I101 to I111 selected from the images captured in May 2018, is selected from the images captured in June 2018. For example, in a case where the first theme is determined as a theme of a kindergarten orientation (for example, there are many images of orientation) and the second theme is determined as a theme of a kindergarten field trip (for example, there are many images of field trip), a theme that is a parent concept of both themes such as a kindergarten event is set as the common theme, and the standard is created such that an image having such a theme is set as the recommended image. In accordance with such a theme, the image of a kindergarten event is decided as the recommended image from the images captured in June 2018.

An image corresponding to the common theme such as a common subject (main subject), a situation related to the action and the like of the subject, an imaging location, an expression of the subject, and an attribute to which the subject belongs is easily selected each month, and an image having common characteristics is easily selected.

Modification Example

Figure 21:
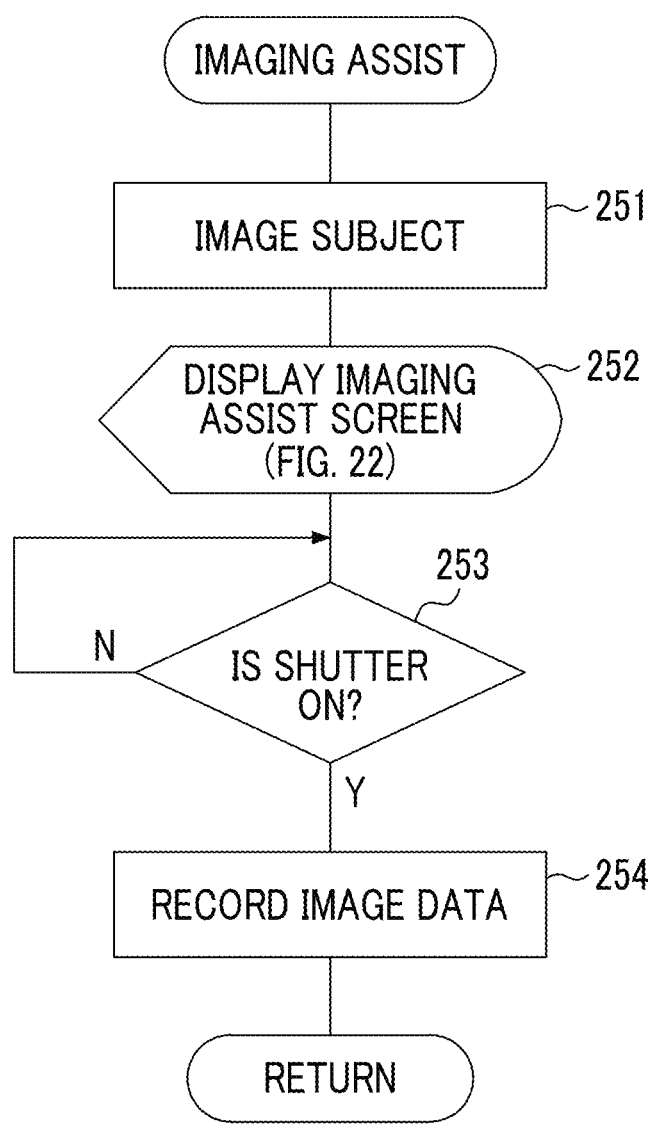
FIG. 21 is a flowchart illustrating an imaging assist process procedure.

FIG. 21 is a flowchart illustrating an imaging assist process procedure. The process illustrated in FIG. 21 is started by setting the smartphone 1 to be in a camera mode.

Figure 22:
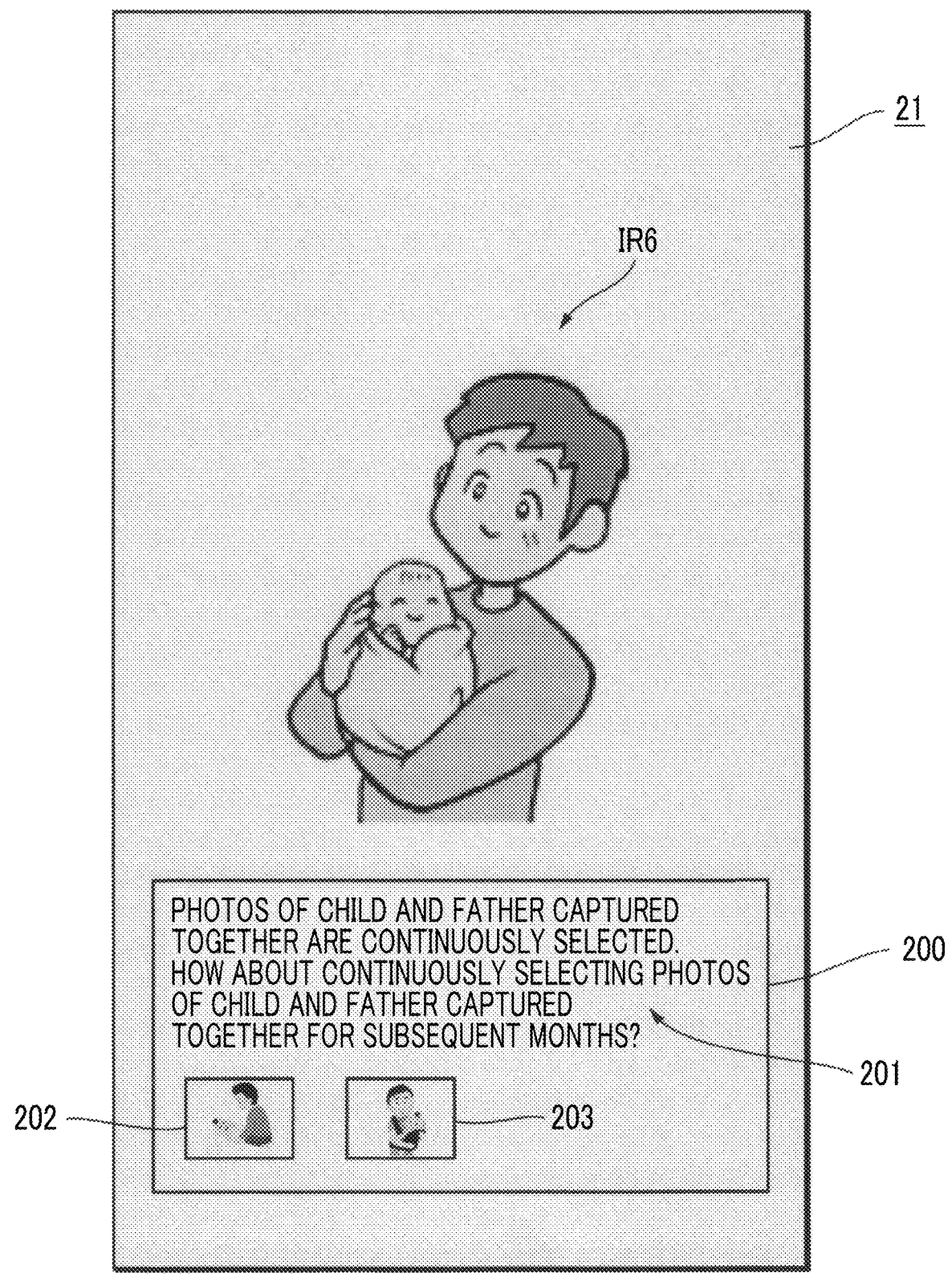
FIG. 22 is one example of the screen displayed on the display panel of the smartphone.

Imaging of the subject is started by the camera unit 41 (step S252), and an imaging assist screen illustrated in FIG. 22 is displayed on the display panel 21.

FIG. 22 is one example of the imaging assist screen.

The imaging assist screen displays the icon IR6 (one example of second information, a theme, and a sample image corresponding to the theme) of a child and a father being together. By seeing the icon IR6, the user perceives that an image of a child and a father captured together is previously selected. Instead of the icon IR6, the image 18 of the first image I61 or the image I110 (one example of the image having the common theme) of the second image 171 may be displayed. In addition, the speech balloon 200 is displayed on the display panel 21 in the same manner as the display panel 21 illustrated in FIG. 17. The speech balloon 200 displays the text string 201 indicating that an image of a child and a father being together is selected, and the selected image display regions 202 and 203.

In a case where a shutter is ON (YES in step S253), the image data obtained by imaging is stored in the internal storage unit 51 (step S254). The user records the image of the child and the father being together.

Figure 23:
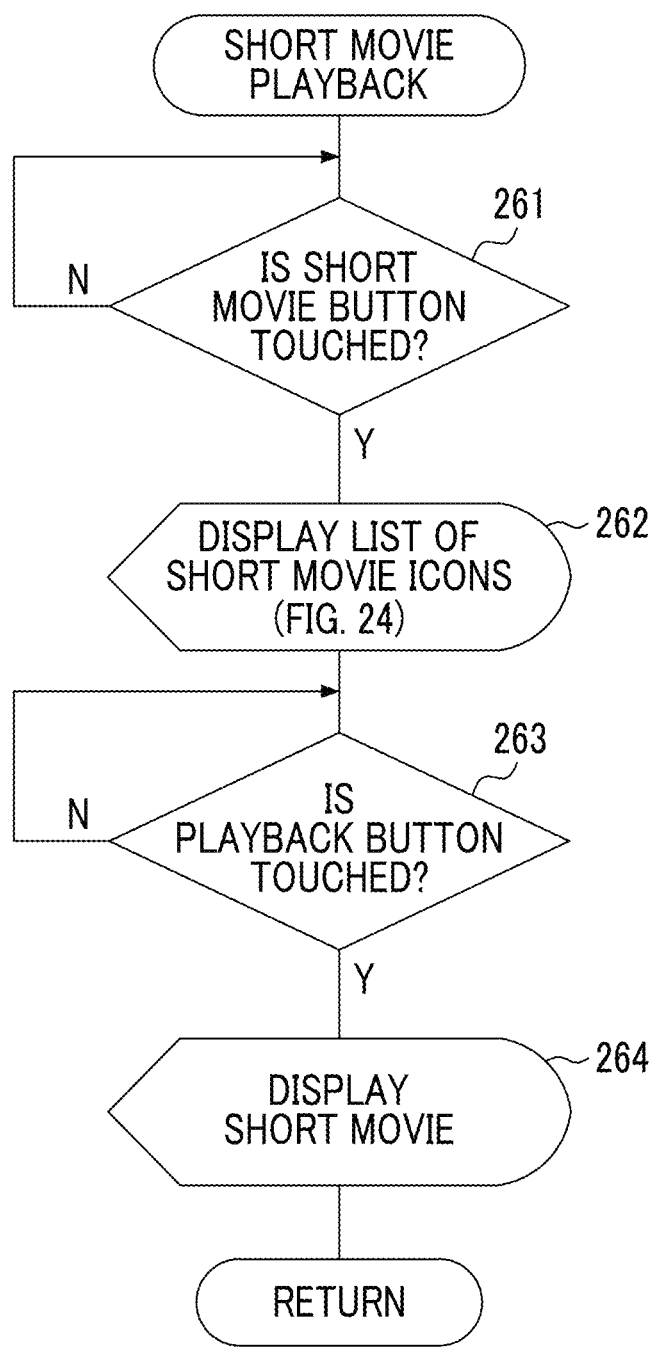
FIG. 23 is a flowchart illustrating a playback process procedure for a short movie.

FIG. 23 is a flowchart illustrating a short movie playback process procedure performed in the smartphone 1.

In a case where a short movie button (not illustrated) is displayed on the display panel 21 of the smartphone 1 and the short movie button is touched (YES in step S261), a list of short movie icons is displayed on the display panel 21 (step S262).

Figure 24:
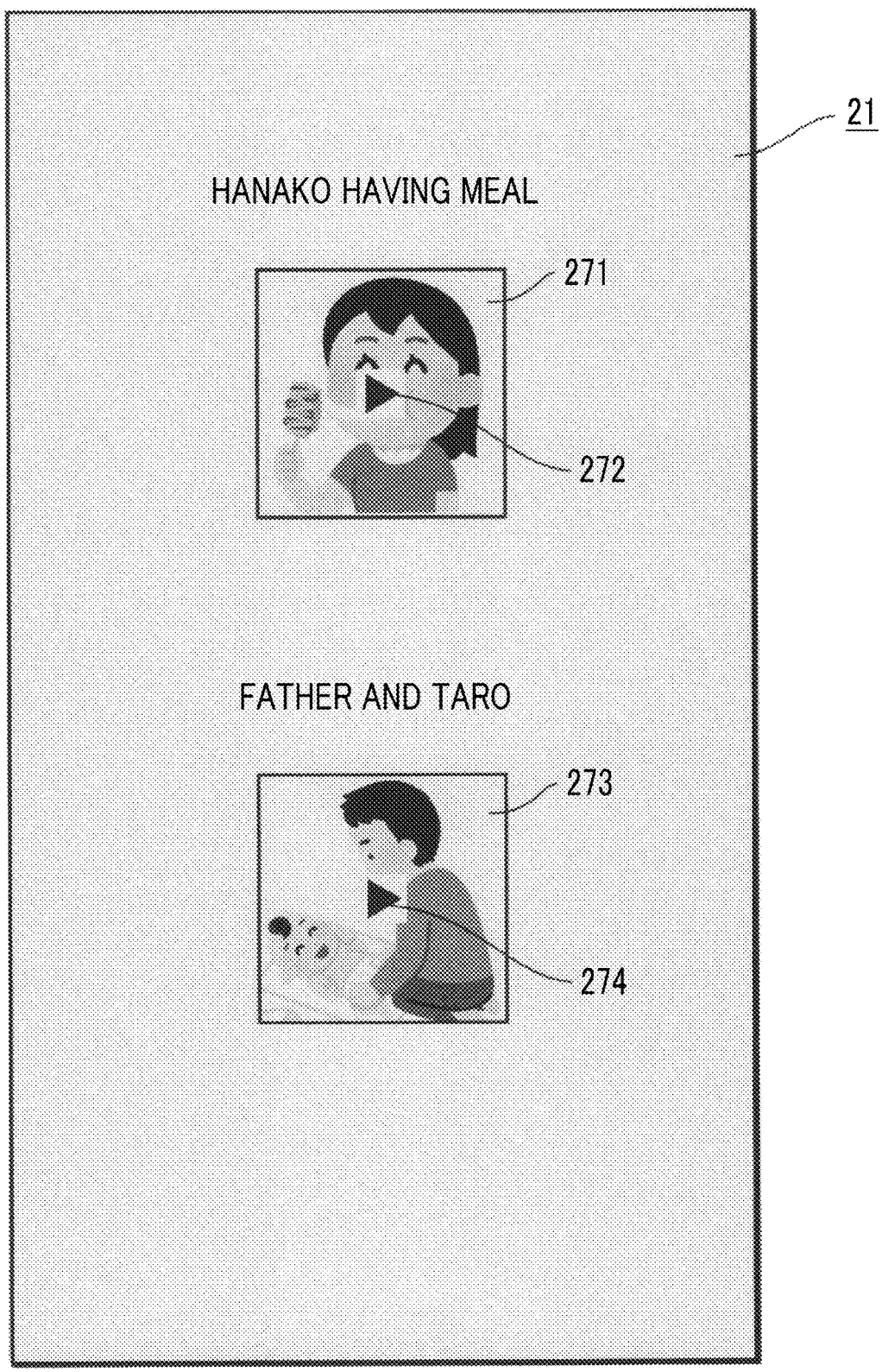
FIG. 24 is one example of the screen displayed on the display panel of the smartphone.

FIG. 24 is one example of a short movie icon list display screen.

Short movie icons 271 and 273 are displayed on the display panel 21. The short movie icon 271 is entitled "Hanako having a meal" as the content of the short movie. The short movie icon 273 is entitled "father and Taro" as the content of the short movie. Those titles are given by analyzing the content of the image displayed as the short movie by the main control unit 100 of the smartphone. For example, the content of the short movie represented by the short movie icon 271 is predicted to be a short movie of having a meal because of having many scenes of having a meal and is entitled "Hanako having a meal". The name "Hanako" is input by the user. The content of the short movie represented by the short movie icon 273 is predicted to be a short movie of a parent and a child because of having many scenes of a male adult and a baby captured together, and is entitled "father and Taro". The name "Taro" is input by the user. The titles of all short movies may be input by the user without using the analysis of the main control unit 100. Playback buttons 272 and 274 are formed in the short movie icons 271 and 273, respectively. In a case where the playback button 272 or 274 is touched (YES in step S263), the short movie corresponding to the short movie icon 271 or 273 of the touched playback button is played back and displayed on the display panel 21 (step S264).

Figure 25:
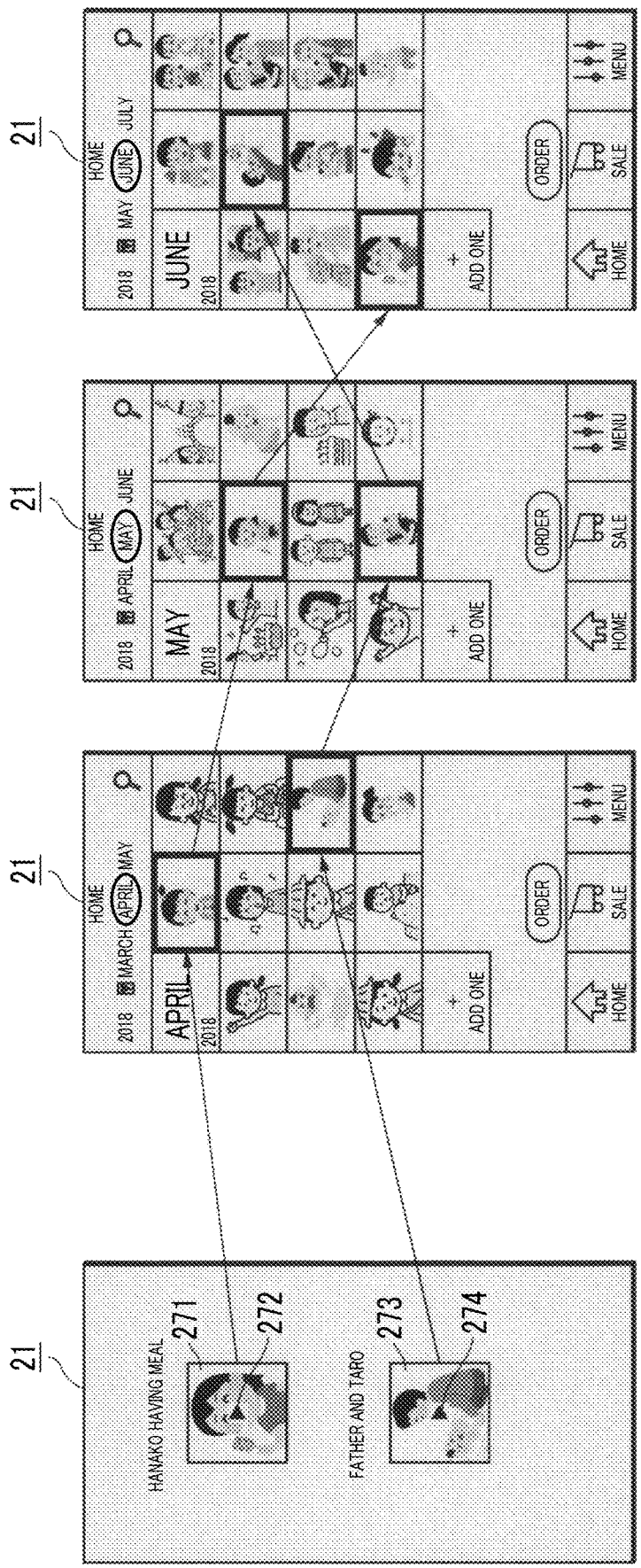
FIG. 25 illustrates a playback content of the short movie.

FIG. 25 illustrates a playback content of the short movie.

In a case where the playback button 272 of the short movie icon 271 is touched, the image of a "child having a meal" selected as described above is displayed for each certain amount of time and is switched to the subsequent image after an elapse of the certain amount of time. FIG. 25 illustrates a display of the image I1 selected in April 2018, the image I104 selected in May 2018, and the image IR2 selected in June 2018 in this order for each certain amount of time. For example, the short movie is displayed by switching images of one year corresponding to the common theme for each certain amount of time. In a case where the image displayed as the short movie is the image recommended from the standard created as described above, the image displayed as the short movie is perceived from the fact of being the recommended image. Alternatively, the image displayed as the short movie may be selected from images having the common theme from the selected images.

Similarly, in a case where the playback button 274 of the short movie icon 273 is touched, the "image of a father and a child captured together" selected as described above is displayed for each certain amount of time and is switched to the subsequent image after the elapse of the certain amount of time. FIG. 25 illustrates a display of the image 18 selected in April 2018, the image I110 selected in May 2018, and the image IR1 selected in June 2018 in this order for each certain amount of time under control of the main control unit 100 (one example of display control means).

Figure 26:
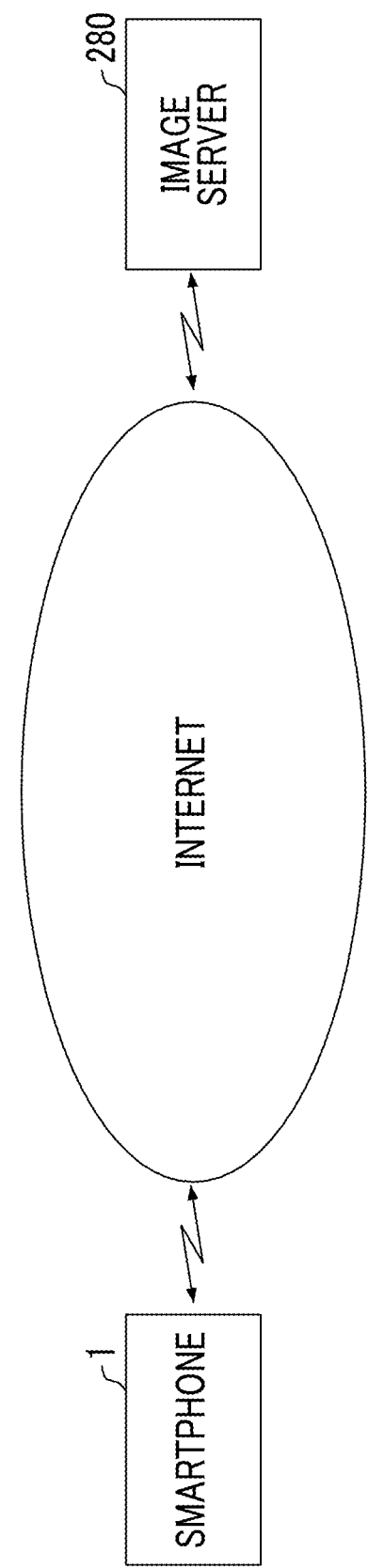
FIG. 26 illustrates a relationship between the smartphone and an image server.
Figure 27:
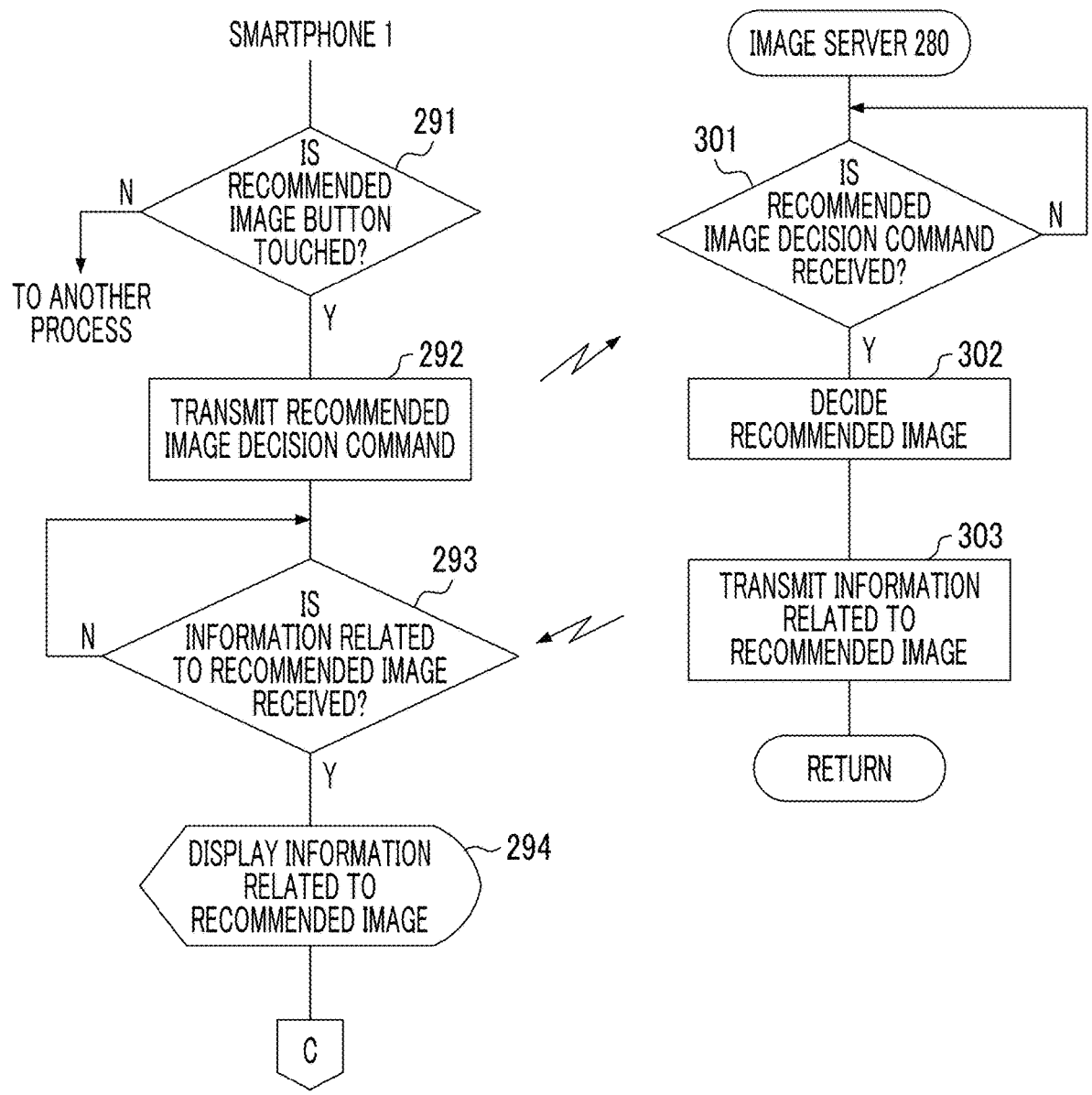
FIG. 27 is a flowchart illustrating process procedures of the smartphone and the image server.

FIG. 26 and FIG. 27 illustrate examples of performing the above process while communicating between the smartphone 1 and the image server 280.

As illustrated in FIG. 26, the smartphone 1 and the image server 280 can communicate with each other through the Internet.

In a case where the recommended image button 152 displayed on the display panel 21 of the smartphone 1 is touched (YES in step S291), a recommended image decision command is transmitted to the image server 280 from the smartphone 1 (step S292).

In a case where the recommended image decision command transmitted from the smartphone 1 is received in the image server 280 (YES in step S301), the decision process illustrated in FIG. 8 for information (one example of the first information) related to the recommended image is performed in the image server 280 (step S302). The image server 280 stores image data representing the previously selected image. Based on the stored image data, it is found which image is selected, and information related to the recommended image is decided based on the selected image. The decided information related to the recommended image is transmitted to the smartphone 1 from the image server 280 (step S303). For example, information for setting the "image of a father and a child captured together" as the recommended image and information for setting the "image of a child having a meal" are transmitted to the smartphone 1 from the image server 280.

In a case where the information (one example of data representing the standard) transmitted from the image server 280 is received by the wireless communication unit 10 (one example of reception means) of the smartphone 1 (YES in step S293), the information related to the recommended image is displayed on the display panel 21 as illustrated in FIG. 17 and the like (step S294).

The process of deciding the information related to the recommended image (process of creating the standard) may be performed in the image server 280. In addition, while the smartphone 1 is used in the above example, a dedicated image processing apparatus, a personal computer, a tablet terminal, or the like other than the smartphone 1 can be used.

Furthermore, a similarity (one example of a second similarity) between the first image 161 or the second image 171 and an image selected from the target image group 180 may be calculated, and an image of which the second similarity is higher than or equal to a second threshold may be displayed (one example of notification of the first information). An image such as the previously selected first image 161 or second image 171 can be selected from the target image group 180.

Processing units executing the above process include not only a CPU 7 functioning as various processing units by executing software but also a programmable logic device such as a field-programmable gate array (FPGA) capable of changing a circuit configuration after manufacturing, a dedicated electric circuit such as an application specific integrated circuit (ASIC) as a processor having a circuit configuration dedicatedly designed to execute a specific process, and the like.

One processing unit may be configured with one of those various processors or may be configured with a combination of two or more processors of the same type or different types (for example, a plurality of FPGAs or a combination of a CPU and an FPGA). A first example of configuring a plurality of processing units with one processor is such that as represented by a computer such as a client computer or a server, one processor is configured with a combination of one or more CPUs and software, and the processor functions as the plurality of processing units. A second example is such that as represented by a system on chip or the like, a processor that implements the function of the whole system including the plurality of processing units using one integrated circuit (IC) chip is used. Various processing units are configured using one or more of the various processors as a hardware structure.

Furthermore, the hardware structure of the various processors is more specifically an electric circuit in which circuit elements such as a semiconductor element are combined.

What is claimed is:

1. An image processing apparatus comprising:
an image group input device for inputting a target image group for selecting one or a plurality of images; and
a processor,
wherein the processor causes a first notification device to perform notification of first information related to an image recommended as the image to be selected from the target image group input from the image group input device based on a standard for selecting the image and created by a selection standard creation device from one or a plurality of first images selected from a first image group and one or a plurality of second images selected from a second image group,
the selection standard creation device creates the standard and selects an image based on the standard, the image having a commonly obtained theme from the plurality of first images and the plurality of second images,
the commonly obtained theme is a predetermined appearance or a predetermined state of change commonly exhibited by a subject appearing commonly in the first image and the second image, and
the first image group is an image group of images captured during a first period, the second image group of images captured is an image group captured during a second period directly following the first period, and the target image group is an image group of images captured during a third period directly following the second period, wherein the first period is one month, the second period is next month following the one month, and the third period is further next month following the next month.

2. The image processing apparatus according to claim 1, wherein the selection standard creation device creates the standard such that an image having a theme obtained in common from the first image and the second image is selected.

3. The image processing apparatus according to claim 1, wherein the selection standard creation device creates the standard such that an image having a theme that is obtained in common from one image of the plurality of first images and one image of the plurality of second images and is a theme other than a theme obtained in common from another image of the plurality of first image and another image of the plurality of second images is selected.

4. The image processing apparatus according to claim 1, wherein the selection standard creation device creates the standard such that an image having a theme obtained in common from themes of all of the plurality of first images and themes of all of the plurality of second images is selected.

5. The image processing apparatus according to claim 1, wherein the selection standard creation device creates the standard such that an image of which a first similarity with both of the first image and the second image is higher than or equal to a first threshold is selected from the target image group.

6. The image processing apparatus according to claim 1, wherein the selection standard creation device creates the standard such that an image showing a change in common subject between a subject included in the first image and a subject included in the second image is selected.

7. The image processing apparatus according to claim 1, further comprising:
the selection standard creation device.

8. The image processing apparatus according to claim 1, wherein the processor is configured to:
receive data representing the standard created by the selection standard creation device,
cause the first notification device to perform the notification of the first information based on the standard represented by the data.

9. The image processing apparatus according to claim 1, wherein the notification of the first information is a display for distinguishing the image recommended as the image to be selected from the target image group from an image other than the recommended image in the target image group.

10. The image processing apparatus according to claim 9, wherein the notification of the first information is a display of the image recommended as the image to be selected from the target image group by attaching a mark to the recommended image.

11. The image processing apparatus according to claim 1, wherein the notification of the first information is a display of a state of a subject in the image recommended as the image to be selected from the target image group using a text string or a sample image.

12. The image processing apparatus according to claim 1, wherein the notification of the first information is a display of an image of the first image or the second image of which a second similarity with the image to be selected from the target image group is higher than or equal to a second threshold.

13. The image processing apparatus according to claim 1, wherein the processor is configured to:
perform notification of second information related to a theme such that an image having the theme obtained from the first image and the second image is captured.

14. The image processing apparatus according to claim 13,
wherein the notification of the second information is a display of the theme.

15. The image processing apparatus according to claim 13,
wherein the notification of the second information is a display of a sample image corresponding to the theme.

16. The image processing apparatus according to claim 13,
wherein the notification of the second information is a display of an image of the first image or the second image having a common theme.

17. The image processing apparatus according to 1, wherein the processor is configured to:
control a display device such that an image having a common theme among the plurality of first images and the plurality of second images is displayed for a certain amount of time in alternate order of the plurality of first images and the plurality of second images.

18. The image processing apparatus according to claim 1, wherein an imaging time period of the first image group, an imaging time period of the second image group, and an imaging time period of the target image group are different.

19. An image processing method comprising:
inputting a target image group for selecting one or a plurality of images;
causing notification of first information related to an image recommended as an image to be selected from the target image group input based on a standard for selecting the image from one or a plurality of first images selected from a first image group and one or a plurality of second images selected from a second image group;
creating the standard; and
selecting an image based on the standard, the image having a commonly obtained theme from the plurality of first images and the plurality of second images, wherein the commonly obtained theme is a predetermined appearance or a predetermined state of change commonly exhibited by a subject appearing commonly in the first image and the second image, and
the first image group is an image group of images captured during a first period, the second image group of images captured is an image group captured during a second period directly following the first period, and the target image group is an image group of images captured during a third period directly following the second period, wherein the first period is one month, the second period is next month following the one month, and the third period is further next month following the next month.

20. A non-transitory recording medium storing a computer-readable program controlling a computer of an image processing apparatus to perform:
inputting a target image group for selecting one or a plurality of images;
causing notification of first information related to an image recommended as an image to be selected from the input target image group based on a standard for selecting the image from one or a plurality of first images selected from a first image group and one or a plurality of second images selected from a second image group;
creating the standard; and
selecting an image based on the standard, the image having a commonly obtained theme from the plurality of first images and the plurality of second images, wherein the commonly obtained theme is a predetermined appearance or a predetermined state of change commonly exhibited by a subject appearing commonly in the first image and the second image, and
the first image group is an image group of images captured during a first period, the second image group of images captured is an image group captured during a second period directly following the first period, and the target image group is an image group of images captured during a third period directly following the second period, wherein the first period is one month, the second period is next month following the one month, and the third period is further next month following the next month.

21. The image processing apparatus according to claim 1, wherein the processor finds a theme obtained in common from the first image and the second image, and creates the standard such that an image having the theme obtained in common from the first image and the second image is selected.

22. The image processing apparatus according to claim 1, wherein the one or a plurality of first images and the one or a plurality of second images are the images that a user has indicated to print, and the recommended image is the image that is recommended for printing to the user.

* * * * *